US010760818B2

(12) United States Patent
Lee et al.

(10) Patent No.: US 10,760,818 B2
(45) Date of Patent: Sep. 1, 2020

(54) AIR CONDITIONER

(71) Applicant: SAMSUNG ELECTRONICS CO., LTD., Suwon-si, Gyeonggi-do (KR)

(72) Inventors: Dong Yoon Lee, Suwon-si (KR); Jae Hyoung Sim, Suwon-si (KR); Do Yeon Kim, Uiwang-si (KR); Do-Hoon Kim, Suwon-si (KR); Byung Yul So, Incheon (KR); Joon-Ho Yoon, Suwon-si (KR); Jung Dae Lee, Seoul (KR); Sung-June Cho, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/820,927

(22) Filed: Mar. 17, 2020

(65) Prior Publication Data
US 2020/0217556 A1    Jul. 9, 2020

Related U.S. Application Data

(63) Continuation of application No. 15/627,786, filed on Jun. 20, 2017, now Pat. No. 10,612,814, which is a
(Continued)

(30) Foreign Application Priority Data

Oct. 23, 2015  (KR) .................. 10-2015-0148300
Mar. 25, 2016  (KR) .................. 10-2016-0036357

(51) Int. Cl.
*F24F 13/20*        (2006.01)
*F24F 1/0047*       (2019.01)
(Continued)

(52) U.S. Cl.
CPC .......... *F24F 13/20* (2013.01); *B01D 46/0005* (2013.01); *B01D 46/4263* (2013.01);
(Continued)

(58) Field of Classification Search
CPC ........ F24F 13/20; F24F 1/0047; F24F 1/0014; F24F 3/1603; F24F 13/084; F24F 13/085;
(Continued)

(56) References Cited

U.S. PATENT DOCUMENTS

| 4,648,372 A | 3/1987 | Michaud |
| 6,023,936 A | 2/2000 | Choi |

(Continued)

FOREIGN PATENT DOCUMENTS

| CN | 1275191 | 11/2000 |
| CN | 1573251 | 2/2005 |

(Continued)

OTHER PUBLICATIONS

International Search Report dated Aug. 18, 2016 in corresponding International Patent Application No. PCT/KR2016/004723.
(Continued)

*Primary Examiner* — Robert Clemente
(74) *Attorney, Agent, or Firm* — Staas & Halsey LLP

(57) ABSTRACT

Disclosed herein is an air conditioner including a suction panel which includes a suction port through which air is suctioned in inside a housing. The suction panel is formed to rotate with an axial direction of an air blowing fan or a direction perpendicular to the axial direction of the air blowing fan as a rotation axis to be coupled with or separated from the housing. Accordingly, a user may easily and intuitively separate the suction panel and falling of the suction panel, which may occur when the suction panel is separated, may be effectively reduced using a supporting unit disposed at the suction panel. Also, the housing and cover members which cover an outer perimeter of a lower portion of the housing may be coupled with each other by pressurizing the cover members toward the housing, thereby allowing the user to easily coupled the cover members.

20 Claims, 36 Drawing Sheets

Related U.S. Application Data continuation of application No. 15/146,197, filed on May 4, 2016, now Pat. No. 9,714,773.

(51) Int. Cl.
| | |
|---|---|
| *F24F 1/0014* | (2019.01) |
| *F24F 13/22* | (2006.01) |
| *F24F 13/08* | (2006.01) |
| *F24F 3/16* | (2006.01) |
| *B01D 46/00* | (2006.01) |
| *B01D 46/42* | (2006.01) |
| *F24F 13/28* | (2006.01) |
| *F24F 13/30* | (2006.01) |
| *B01D 46/52* | (2006.01) |

(52) U.S. Cl.
CPC .......... *B01D 46/523* (2013.01); *F24F 1/0014* (2013.01); *F24F 1/0047* (2019.02); *F24F 3/1603* (2013.01); *F24F 13/084* (2013.01); *F24F 13/085* (2013.01); *F24F 13/222* (2013.01); *F24F 13/28* (2013.01); *F24F 13/30* (2013.01); *B01D 2275/202* (2013.01); *B01D 2279/50* (2013.01)

(58) Field of Classification Search
CPC .......... F24F 13/222; F24F 13/28; F24F 13/30; B01D 2279/50; B01D 46/0005; B01D 46/4263

See application file for complete search history.

(56) References Cited

U.S. PATENT DOCUMENTS

| | | | |
|---|---|---|---|
| 6,248,147 B1 | 6/2001 | Liao | |
| 6,389,832 B1 | 5/2002 | Wu | |
| 7,066,712 B2* | 6/2006 | Kim | F04D 17/165 415/58.4 |
| 7,905,936 B2 | 3/2011 | Coulonvaux | |
| 8,006,512 B2* | 8/2011 | Sanagi | F24F 1/0011 62/426 |
| 2002/0152760 A1 | 10/2002 | Okuda et al. | |
| 2004/0244403 A1 | 12/2004 | Kim et al. | |
| 2006/0090432 A1 | 5/2006 | Merritt | |
| 2007/0289265 A1 | 12/2007 | Coulonvaux | |
| 2008/0179049 A1 | 7/2008 | Mathur | |
| 2009/0013711 A1 | 1/2009 | Sakashita et al. | |
| 2010/0192611 A1 | 8/2010 | Yamaguchi et al. | |
| 2011/0000566 A1 | 1/2011 | Ruponen et al. | |
| 2014/0150658 A1 | 6/2014 | Prax | |
| 2016/0178295 A1 | 6/2016 | Perez Lopez | |

FOREIGN PATENT DOCUMENTS

| | | |
|---|---|---|
| CN | 1754070 | 3/2006 |
| CN | 101802509 | 8/2010 |
| CN | 103388895 | 11/2013 |
| CN | 203379675 | 1/2014 |
| CN | 204395629 | 6/2015 |
| CN | 204923247 | 12/2015 |
| DE | 202012102638 | 10/2012 |
| EP | 1035384 | 9/2000 |
| EP | 2221550 | 8/2010 |
| EP | 2233851 | 9/2010 |
| EP | 2829737 | 1/2015 |
| EP | 2894415 | 7/2015 |
| JP | 8-178345 | 7/1996 |
| JP | 11-201494 | 7/1999 |
| JP | 2007-130628 | 5/2007 |
| JP | 2008-22933 | 2/2008 |
| KR | 10-2008-0110109 | 12/2008 |
| KR | 20-0446120 | 9/2009 |
| KR | 10-2014-0037985 | 3/2014 |
| WO | 03/105993 | 12/2003 |
| WO | 2011/137367 | 11/2011 |

OTHER PUBLICATIONS

Korean Office Action dated Mar. 8, 2017 in Korean Patent Application No. 10-2016-0036357.
Extended European Search Report dated Mar. 30, 2017 in European Patent Application No. 16168421.2.
U.S. Notice of Allowance dated Mar. 22, 2017 in U.S. Appl. No. 15/146,197.
U.S. Office Action dated Dec. 15, 2016 in U.S. Appl. No. 15/146,197.
U.S. Office Action dated Jul. 12, 2016 in U.S. Appl. No. 15/146,197.
Korean Office Action dated Jul. 21, 2017 in Korean Patent Application No. 10-2016-0036357.
Korean Office Action dated Dec. 19, 2017 in Korean Patent Application No. 10-2016-0036357.
Korean Notice of Allowance dated Apr. 19, 2018 in Korean Patent Application No. 10-2016-0036357.
Chinese Office Action dated Jul. 20, 2018 in Chinese Patent Application No. 201711206268.0.
Korean Office Action dated Oct. 22, 2018 in Korean Patent Application No. 10-2017-0137523.
Russian Office Action dated Nov. 13, 2018 in Russian Patent Application No. 2018114684/12.
Extended European Search Report dated Nov. 20, 2018 in European Patent Application No. 18166341.0.
Australian Office Action dated Dec. 10, 2018 in Australian Patent Application No. 2016340532.
Chinese Office Action dated Jan. 31, 2019 in Chinese Patent Application No. 201711206268.0.
Australian Notice of Allowance dated Apr. 2, 2019 in Australian Patent Application No. 2016340532.
Korean Office Action dated Apr. 15, 2019 in Korean Patent Application No. 10-2017-0137523.
Russian Office Action dated Apr. 5, 2019 in Russian Patent Application No. 2018114684/12(022966).
European Communication dated Aug. 21, 2019 in European Patent Application No. 16168421.2.
Chinese Office Action dated May 29, 2019 in Chinese Patent Application No. 201711206268.0.
Korean Notice of Allowance dated Oct. 11, 2019 in Korean Patent Application No. 10-2017-0137523.
Chinese Office Action dated Nov. 28, 2019 in Chinese Patent Application No. 201610301216.0.
Chinese Office Action dated Dec. 19, 2019 in Chinese Patent Application No. 201810414397.7.
U.S. Office Action dated Mar. 22, 2019 in U.S. Appl. No. 15/627,786.
U.S. Office Action dated Sep. 18, 2019 in U.S. Appl. No. 15/627,786.
U.S. Notice of Allowance dated Nov. 26, 2019 in U.S. Appl. No. 15/627,786.
U.S. Appl. No. 15/627,786, filed Jun. 20, 2017, Dong Yoon Lee, et al., Samsung Electronics Co., Ltd.
U.S. Appl. No. 15/146,197 (now U.S. Pat. No. 9,714,773), filed May 4, 2016, Dong Yoon Lee, et al., Samsung Electronics Co., Ltd.
European Communication dated Mar. 16, 2020 in European Patent Application No. 18166341.0.

\* cited by examiner

AIR CONDITIONER

CROSS-REFERENCE TO RELATED APPLICATIONS

This application is a continuation of U.S. patent application Ser. No. 15/627,786 filed on Jun. 20, 2017, which is a continuation of U.S. patent application Ser. No. 15/146,197 filed on May 4, 2016, which claims the benefit of Korean Patent Application Nos. 10-2015-0148300, filed on Oct. 23, 2015 and 10-2016-0036357, filed on Mar. 25, 2016 in the Korean Intellectual Property Office, the disclosures of which are incorporated herein by reference.

BACKGROUND

1. Field

Embodiments of the present disclosure relate to a suction panel and a cover member for forming a suction port of an air conditioner.

2. Description of the Related Art

An air conditioner is an apparatus which includes a compressor, a condenser, an expansion valve, an evaporator, an air blowing fan, etc. and control an indoor temperature, indoor humidity, an indoor air flow, etc. using a cooling cycle. Air conditioners may be divided into a separated type which includes an indoor unit disposed indoors and an outdoor unit disposed outdoors and an integrated type which includes both an indoor unit and an outdoor unit disposed in a single housing.

An indoor unit of an air conditioner includes a heat exchanger which thermally exchanges a refrigerant with air, an air blowing fan which moves air, and a motor which drives the air blowing fan to cool or heat a room.

Indoor units of air conditioners suction indoor air to perform a heat exchange using heat exchangers, and discharge the thermally exchanged air. Here, filters may be disposed in suction ports through which air is suctioned so as to discharge, suction, and discharge fresh air.

Users may maintain a clean state of indoor air by regularly cleaning the filters, by separating suction panels at which suction ports are provided to remove the filters to the outside of air conditioners to clean the filters.

Particularly, in the case of a ceiling-embedded air conditioner, it is difficult for users to separate suction panels disposed at high positions.

SUMMARY

Therefore, it is an aspect of the present disclosure to provide an air conditioner which allows a user to easily separate a suction panel.

It is another aspect of the present disclosure to provide an air conditioner which allows a user to easily couple a cover member.

It is another aspect of the present disclosure to provide an air conditioner which includes a circular filter.

Additional aspects of the present disclosure will be set forth in part in the description which follows and, in part, will be obvious from the description, or may be learned by practice of the present disclosure.

In accordance with one aspect of the present disclosure, an air conditioner includes a housing, a heat exchanger provided inside the housing, and a suction panel which includes a suction port and has a circular shape. Here, the suction panel is configured to rotate with respect to the housing in a circumferential direction of the suction panel and to be separably coupled with the housing.

The suction panel may include a coupling member provided on one side of the suction panel to be inserted into and coupled with the housing, and the housing may include a coupling portion which supports the coupling member inserted into the housing.

A plurality of such coupling members may be arranged in the circumferential direction of the suction panel, and a plurality of such coupling portions may be provided corresponding to the plurality of coupling members.

The coupling member may include a guide surface which guides the coupling member to the coupling portion and includes a curved surface and an insertion protrusion which protrudes from one side of the guide surface and is supported by the coupling portion.

A filter to be separably coupled with the suction panel may be disposed on a side on which the coupling member of the suction panel is provided, and the coupling member may further include a hook which supports at least one side of the filter.

The coupling portion may include a guide groove which guides an insertion and a withdrawal of the coupling member, an insertion groove into which the coupling member is inserted, and a supporting step which supports the inserted coupling member.

The housing may include an upper housing which covers the heat exchanger and a lower housing disposed on one side of the heat exchanger. The lower housing may include a first lower housing, which includes one side adjacent to the heat exchanger, and a second lower housing disposed on the other side of the first lower housing. The guide groove may be provided in the second lower housing, and the insertion groove and the supporting step may be provided in the first lower housing.

The air conditioner may further include a supporting unit which includes a connecting member connecting one side of the suction panel with one side of the housing so as to support the suction panel while the suction panel is spaced apart from the housing when the suction panel is separated from the housing.

The air conditioner may further include a supporting unit which includes a link member connecting the suction panel with the housing so as to support the suction panel while the suction panel is spaced apart from the housing when the suction panel is separated from the housing, and a slide slit provided in each of the suction panel and the housing to allow both ends of the link member to slide with respect to the suction panel and the housing.

The housing may be provided in a cylindrical shape. The heat exchanger may be provided in an annular shape. The housing may include a discharge port which is located between an inner circumferential surface of the housing and an outer circumferential surface of the heat exchanger and includes a circular arc shape. The suction panel may be provided inside the discharge port in a radial direction.

In accordance with another aspect of the present disclosure, an air conditioner includes a housing including a cylindrical shape, a heat exchanger provided inside the housing, a drain tray disposed to collect condensate water generated by the heat exchanger, and a cover member which covers an outer perimeter of the housing and includes a circular opening. Here, the cover member is coupled with at least one of the housing and the drain tray and is provided to be rotatable with respect to the housing in a circumferential direction.

The housing and the drain tray may include a first assembling portion and a second assembling portion which protrude outward from outer circumferential surfaces thereof and are disposed at corresponding positions to overlap with each other, respectively. A recessed portion may be formed in at least one of the first assembling portion and the second assembling portion to be concave in an axial direction of the housing.

The cover member may include a coupling hook capable of being hook-coupled with at least one of the first assembling portion and the second assembling portion. The recessed portion may have a larger width than a width of the coupling hook. The cover member may rotate as much as a difference between the widths of the recessed portion and the coupling hook to control a gap.

The cover member may include a coupling slit which includes a longitudinal portion which extends in a circumferential direction of the circular opening. The cover member may be coupled with at least one of the first assembling portion and the second assembling portion and then may rotate as much as a length of the longitudinal portion to control a gap.

The cover member may rotate in the circumferential direction of the housing and may be supported by at least one of the first assembling portion and the second assembling portion.

A coupling protrusion which protrudes inward in a radial direction of the cover member may be provided at an inner circumferential surface of the cover member, and the coupling protrusion may be supported by and coupled with at least one of the first assembling portion and the second assembling portion when disposed in a position overlapping the first and second assembling portions.

The cover member may further include an auxiliary coupling protrusion which protrudes inward in the radial direction of the cover member to be coupled with one side of the recessed portion when supported by the at least one of the first assembling portion and the second assembling portion.

The cover member may be selectable from cover members in different shapes, and the recessed portion is coupled with the selected cover member.

The selected cover member may include a coupling hook coupled with the recessed portion, and the recessed portion may have a larger width than a width of the coupling hook to control a gap.

The selected cover member may include a coupling protrusion supported by at least one of the first and second assembling portions and an auxiliary coupling protrusion coupled with the recessed portion to limit rotating of the cover member.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
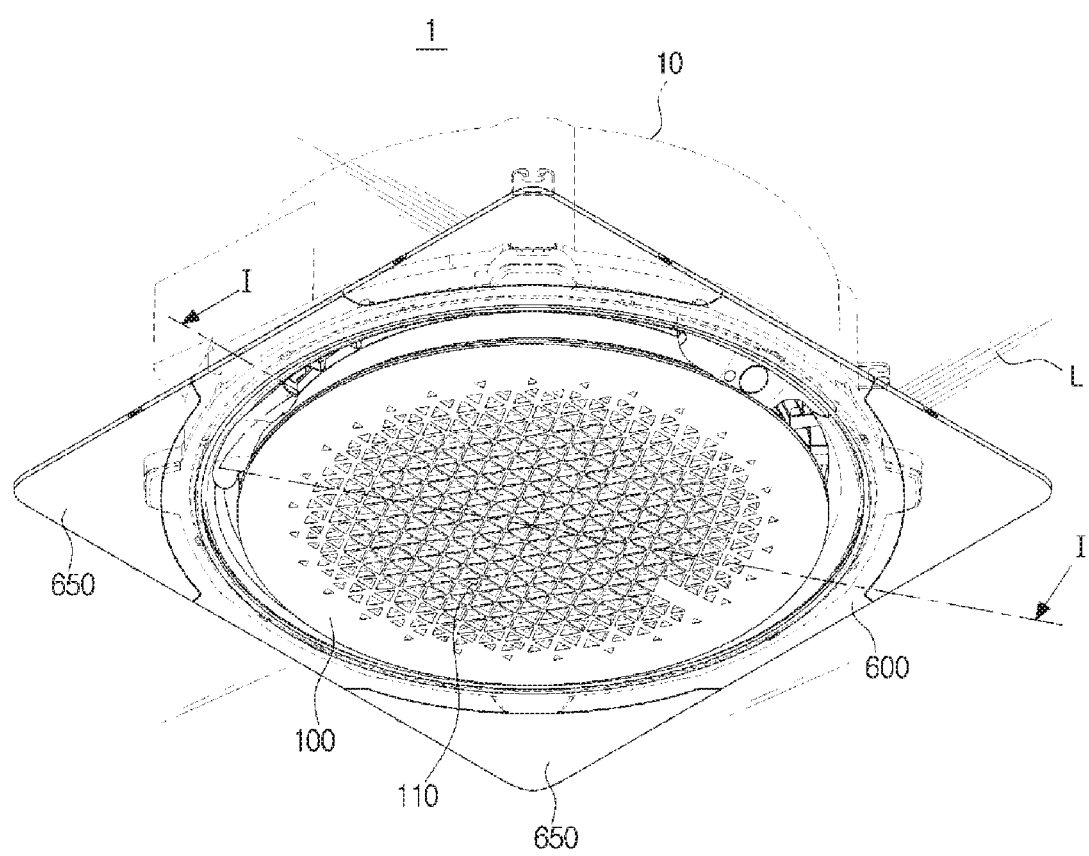
FIG. 1 is a perspective view of an indoor unit of the air conditioner in accordance with one embodiment of the present disclosure.

Embodiments described herein and configurations shown in the drawings are merely exemplary examples. Also, various modified examples with which these embodiments and the drawings could be replaced may be present at the time of filing of the present application.

Also, throughout the drawings, like reference numerals designate like elements.

Also, the terms used herein explain the embodiments but are not intended to restrict and/or limit the present disclosure. Singular expressions, unless defined otherwise in context, include plural expressions. Throughout the specification, the terms "comprise" and "have", etc. are used herein to specify the presence of stated features, numbers, steps, operations, elements, components or combinations thereof but do not preclude the presence or addition of one or more other features, numbers, steps, operations, elements, components, or combinations thereof.

Also, it should be understood that although the terms "first", "second", etc. may be used herein to describe various components, these components are not limited by these terms. These terms are used only to distinguish one component from another. For example, without departing from the scope of the present disclosure, a first component may be referred to as a second component, and similarly, the second component may be referred to as the first component. The term "and/or" includes any and all combinations of one or a plurality of associated listed items.

Also, 'upper', 'upward', 'lower', and 'downward' used herein refer to a vertical direction of an air conditioner in accordance with one embodiment of the present disclosure shown in FIG. 1. That is, a side on which a suction port of the air conditioner is provided is referred to as a lower side and a side thereabove is referred to as an upper side.

Also, the embodiment is not to be limited to one embodiment of the present disclosure but may be applied to an air conditioner which includes blades.

Also, the air conditioner in accordance with one embodiment of the present disclosure includes a heat exchanger in an annular shape but is not limited thereto and may be applied to air conditioners which include heat exchangers in a quadrangular shape or various shapes.

Hereinafter, embodiments of the present disclosure will be described in detail with reference to the attached drawings.

Figure 2:
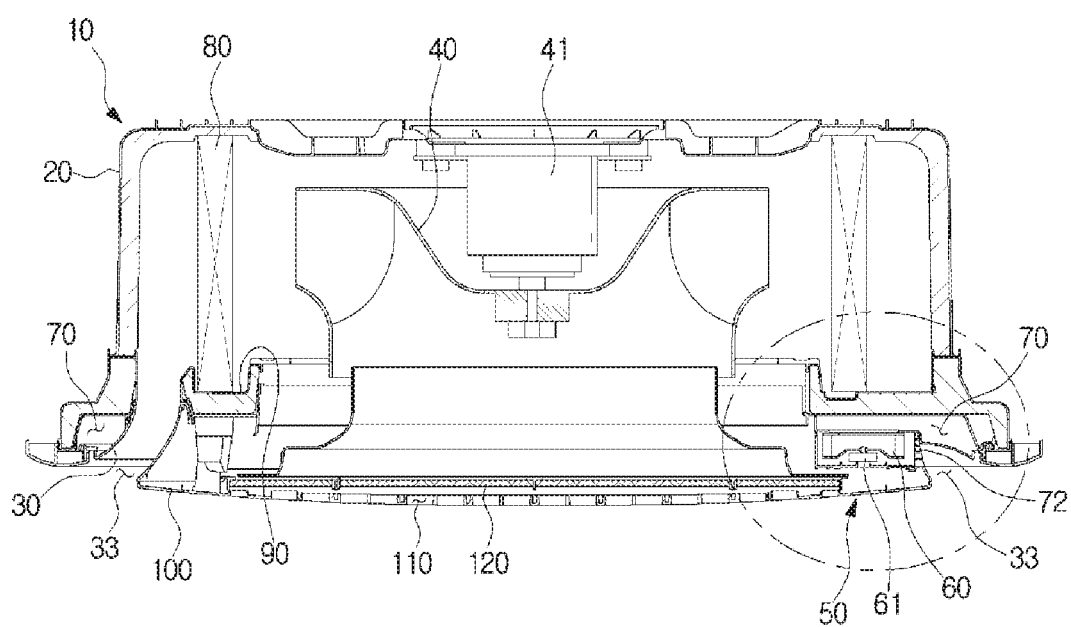
FIG. 2 is a cross-sectional view illustrating a portion taken along line I-I shown in FIG. 1.
Figure 3:
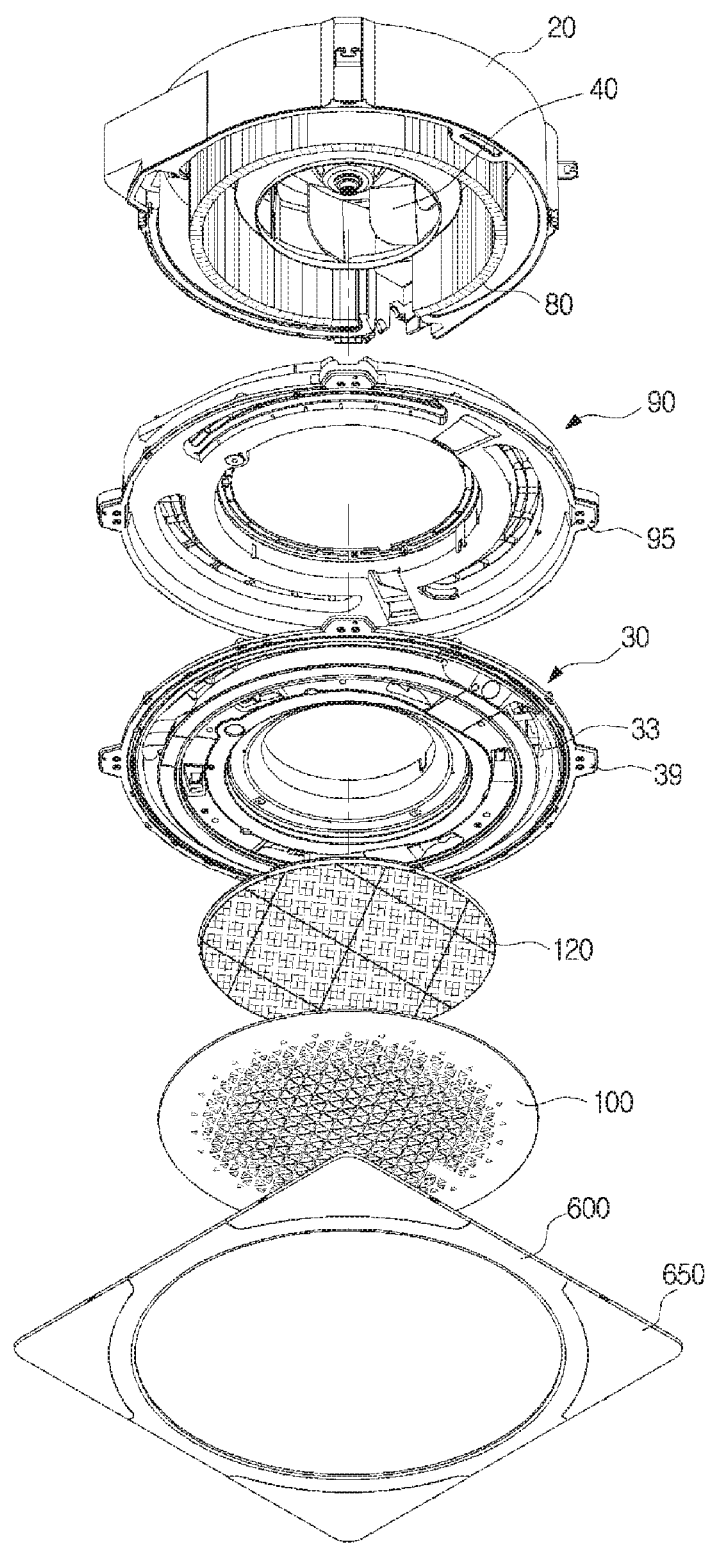
FIG. 3 is an exploded perspective view of the air conditioner in accordance with one embodiment of the present disclosure.
Figure 4:
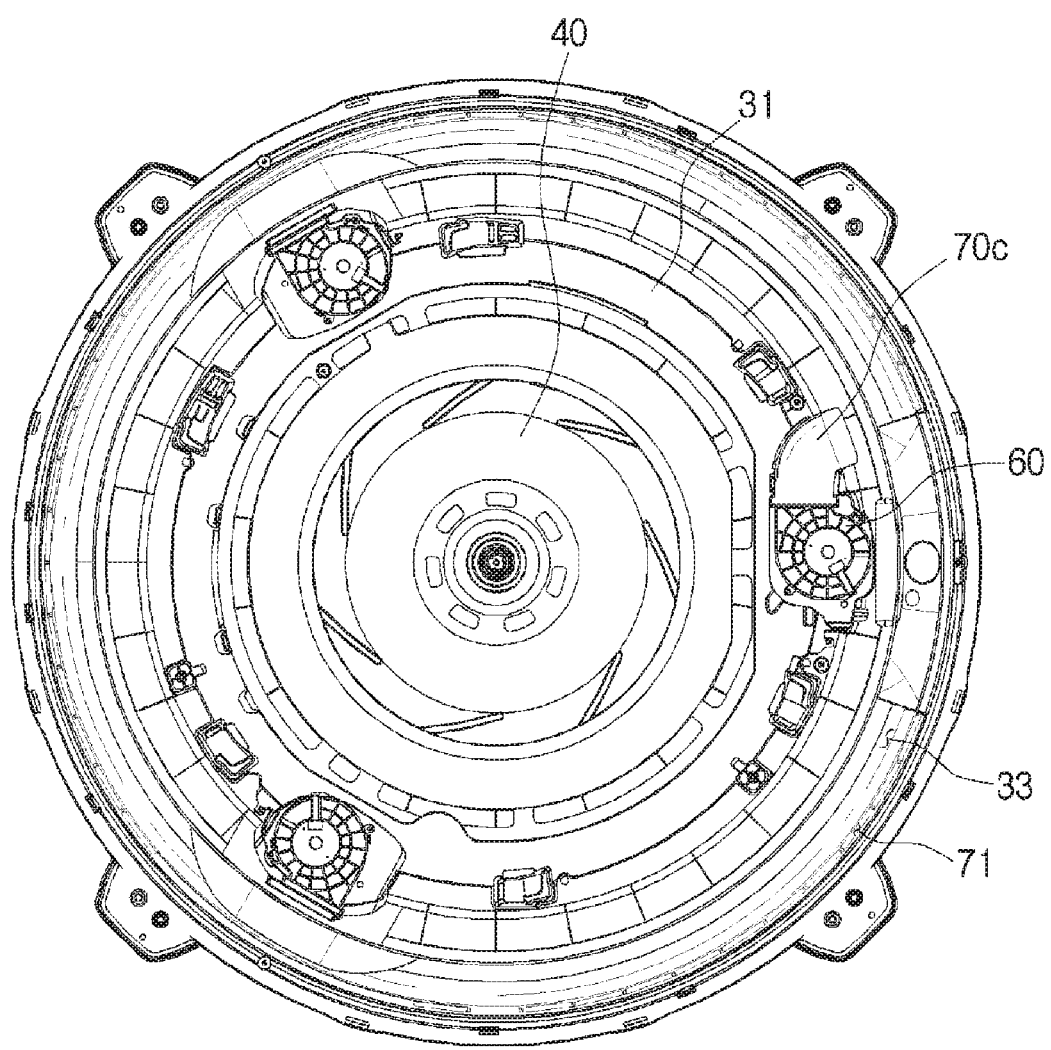
FIG. 4 is a rear view illustrating a state in which a second lower housing of the air conditioner in accordance with one embodiment of the present disclosure is removed.
Figure 5:
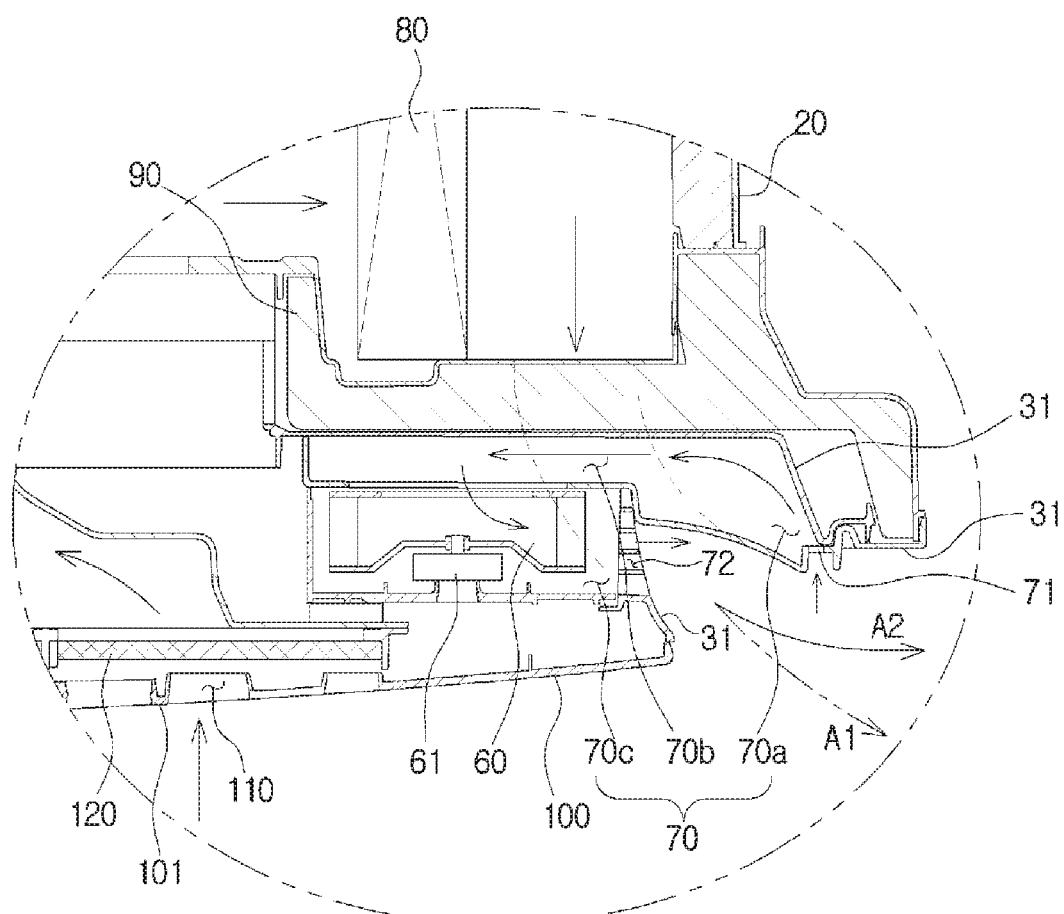
FIG. 5 is an enlarged view of a part shown in FIG. 2.

FIG. 1 is a perspective view of an indoor unit of the air conditioner in accordance with one embodiment of the present disclosure. FIG. 2 is a cross-sectional view illustrating a portion taken along line I-I shown in FIG. 1. FIG. 3 is an exploded perspective view of the air conditioner in accordance with one embodiment of the present disclosure. FIG. 4 is a rear view illustrating a state in which a second lower housing of the air conditioner in accordance with one embodiment of the present disclosure is removed. FIG. 5 is an enlarged view of a part shown in FIG. 2.

Referring to FIGS. 1 and 5, a schematic configuration of the air conditioner in accordance with one embodiment of the present disclosure will be described.

An indoor unit 1 of the air conditioner may be installed on a ceiling L. At least a portion of the indoor unit 1 of the air conditioner may be embedded in the ceiling L.

The indoor unit 1 of the air conditioner includes a housing 10 which includes a suction port 110 and a discharge port 33, a heat exchanger 80 provided inside the housing 10, and an air blowing fan 40 which moves air.

The housing 10 may have an approximately circular shape when viewed from above or below. The housing 10 may include an upper housing 20 disposed inside the ceiling L and a lower housing 30 coupled below the upper housing 20.

A suction panel 100 which includes the suction port 110 through which air is suctioned may be provided in a central portion of the lower housing 30, and the discharge port 33 through which the air is discharged may be formed outside the suction port 110 in a radial direction. The discharge port 33 may have an approximately circular shape when viewed from above or below.

The lower housing 30 may include a first lower housing 31 which is coupled with the upper housing 20 and forms the discharge port 33 and a second lower housing 32 which covers a lower side of the first lower housing 31.

As shown in FIG. 5, the first lower housing 31 may include three components. However, it may be provided with a plurality of components for ease of assembly in a process but may be formed as a single component.

In the structure described above, the indoor unit 1 of the air conditioner may suction air from a lower side to cool or heat and may discharge the air through the lower side.

A filter 120 may be coupled with an upper side of the suction panel 100 to filter out dust from the air suctioned through the suction port 110.

The heat exchanger 80 may have an approximately circular shape when viewed from above or below.

The heat exchanger 80 may be disposed at a drain tray 90 to allow condensed water generated by the heat exchanger 80 to be collected at the drain tray 90.

The air blowing fan 40 may be provided inside the heat exchanger 80 in a radial direction. The air blowing fan 40 may be a centrifugal fan which suctions air in an axial direction and discharges the air in the radial direction. The indoor unit 1 of the air conditioner may include an air blowing motor 41 for driving the air blowing fan 40.

Due to the components described above, the indoor unit 1 of the air conditioner may suction, cool, and discharge indoor air into a room or may suction, heat, and discharge indoor air into the room The indoor unit 1 of the air conditioner further includes an air flow controller 50 which controls a discharged air flow.

The air flow controller 50 may suction air around the discharge port 33 and change a pressure thereof, and thereby control a direction of the discharged air flow. Also, the air flow controller 50 may control a suction rate of the air around the discharge port 33. That is, the air flow controller 50 may control the direction of the discharged air flow by controlling the suction rate of the air around the discharge port 33.

Here, the controlling of the direction of the discharged air flow refers to controlling an angle of the discharged air flow.

The air flow controller 50 may suction the air from one side of a movement direction of the discharged air flow when suctioning the air around the discharge port 33.

That is, as shown in FIG. 5, when the movement direction of the discharged air flow while the air flow controller 50 does not operate is a direction A1, the air flow controller 50 operates and suctions the air from one side of the direction A1, thereby switching the movement direction of the discharged air flow into a direction A2.

Here, an angle to be switched may be adjusted according to a suction rate. That is, switching may be performed at a small angle when the suction rate is low and may be performed at a large angle when the suction rate is high.

The air flow controller 50 may discharge the suctioned air toward an opposite side of the movement direction A1 of the discharged air flow. Thereby, the angle of the discharged air flow may become larger and an air flow may be more smoothly controlled.

The air flow controller 50 may suction air at the outside of the discharge port 33 in a radial direction. As described above, since the air flow controller 50 suctions the air at the outside of the discharge port 33 in the radial direction, the discharged air flow may widely spread from a central portion of the discharge port 33 to the outside in the radial direction.

The air flow controller 50 includes an air flow controlling fan 60 which generates a suction force for suctioning the air around the discharge port 33, an air flow controlling motor 61 for driving the air flow controlling fan 60, and a guide flow path 70 which guides the air suctioned by the air flow controlling fan 60.

The air flow controlling fan 60 may be accommodated inside the lower housing 30. In detail, the air flow controlling fan 60 may be provided in an internal space of the lower housing 30 formed by the first lower housing 31 and the second lower housing 32.

In the embodiment, three such air flow controlling fans 60 are provided at angles of 120 degrees, but the number thereof is not limited thereto. The number and arrangement of the air flow controlling fans 60 may be variously designed.

Also, in the embodiment, the air flow controlling fan 60 is a centrifugal fan, but is not limited thereto, and may be one of various fans such as an axial flow fan, a cross flow fan, a diagonal flow fan, etc. according to design specifications.

The guide flow path 70 connects an inlet 71 which suctions the air around the discharge port 33 with an outlet 72 which discharges the suctioned air.

The inlet 71 may be formed on an outer circumferential surface of the discharge port 33, and the outlet 72 may be provided on an inner circumferential surface of the discharge port 33 opposite to the inlet 71. That is, the inlet 71 and the outlet 72 may be provided on the lower housing 30 which forms the discharge port 33.

Due to these components, as described above, the air flow controller 50 may discharge suctioned air to the opposite side of the movement direction A1 of the discharged air flow, may increase the angle of the discharged air flow, and may more smoothly control an air flow.

The guide flow path 70 may include a first flow path 70a formed in a circumferential direction of the lower housing 30 and connected to the inlet 71, a second flow path 70b which extends from the first flow path 70a to an inside in a radial direction, and a third flow path 70c formed in an area in which the air flow controller 60 is mounted.

Accordingly, air suctioned through the inlet 71 may pass through the first flow path 70a, the second flow path 70b, and the third flow path 70c and may be discharged through the outlet 72.

However, such a structure of the guide flow path 70 is merely an example and the guide flow path 70 is not limited in structure, shape, and arrangement while connecting the inlet 71 with the outlet 72.

Due to these components, an indoor unit of an air conditioner in accordance with one embodiment of the present disclosure may control a discharged air flow without a blade structure in comparison to a conventional structure which includes a blade in a discharge port and controls a discharged air flow by rotating the blade. Accordingly, as an interruption caused by a blade is absent, a discharge rate may increase and a flow noise may be reduced.

Also, the discharge port of the indoor unit of the conventional air conditioner has to have a linear shape to rotate the blade. The discharge port of the indoor unit of the air conditioner in accordance with the embodiment of the present disclosure may be provided in a circular shape.

Also, the discharge port of the indoor unit of the conventional air conditioner has to have a linear shape to rotate the blade. However, the discharge port of the indoor unit of the air conditioner in accordance with the embodiment of the present disclosure may be provided in a circular shape. Accordingly, since the housing, the heat exchanger, etc. may also be provided in circular shapes, aesthetic properties may increase due to a differentiated design. Also, considering that a shape of the air blowing fan is generally circular, an air flow may naturally flow and a loss in pressure may be reduced and cooling or heating properties of the air conditioner may be increased.

Hereinafter, the suction panel 100 and combination and separation between the suction panel 100 and the lower housing 30 will be described in detail.

Figure 6:
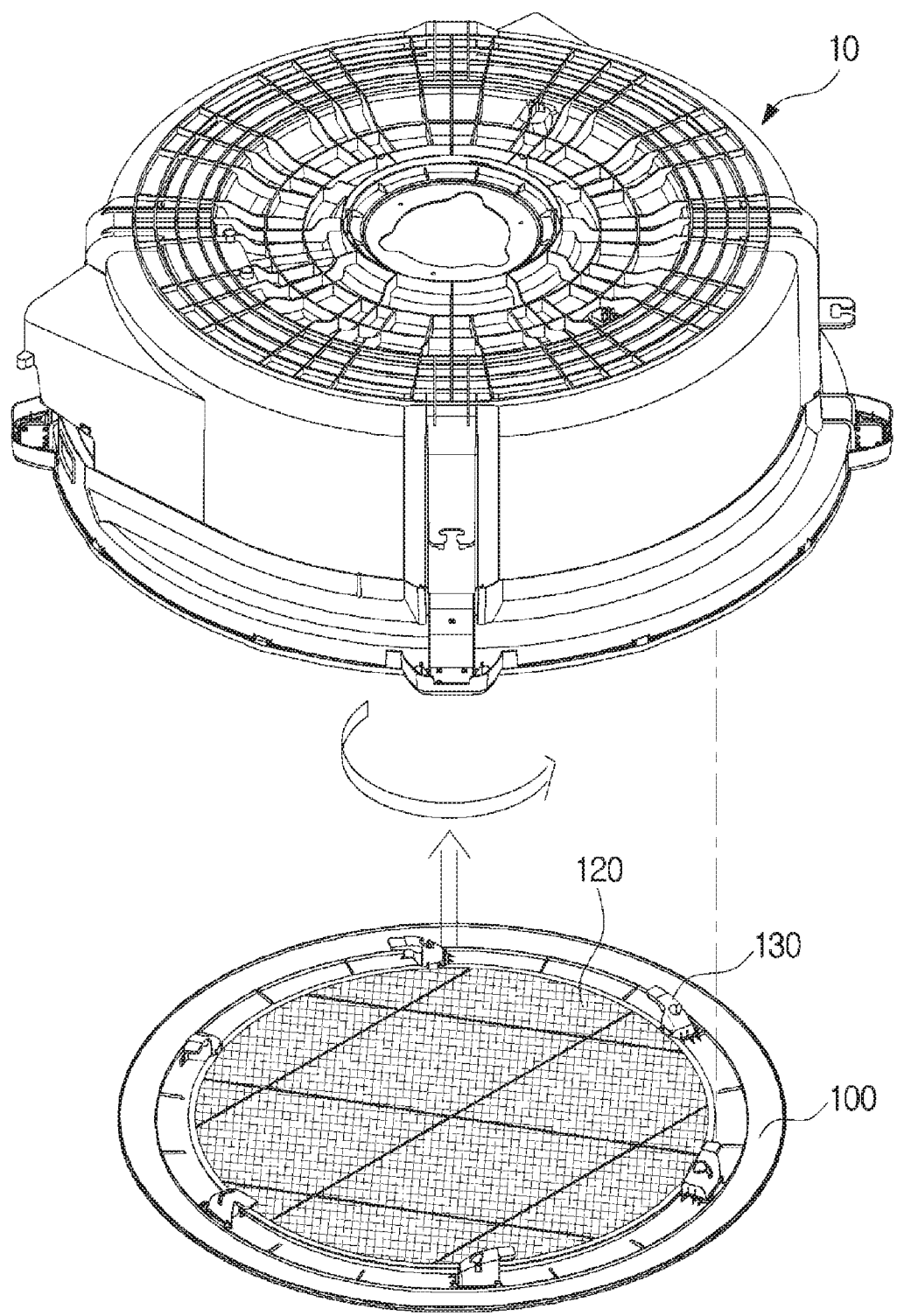
FIG. 6 is a view illustrating a shape of a separated suction panel of the air conditioner in accordance with one embodiment of the present disclosure.
Figure 7:
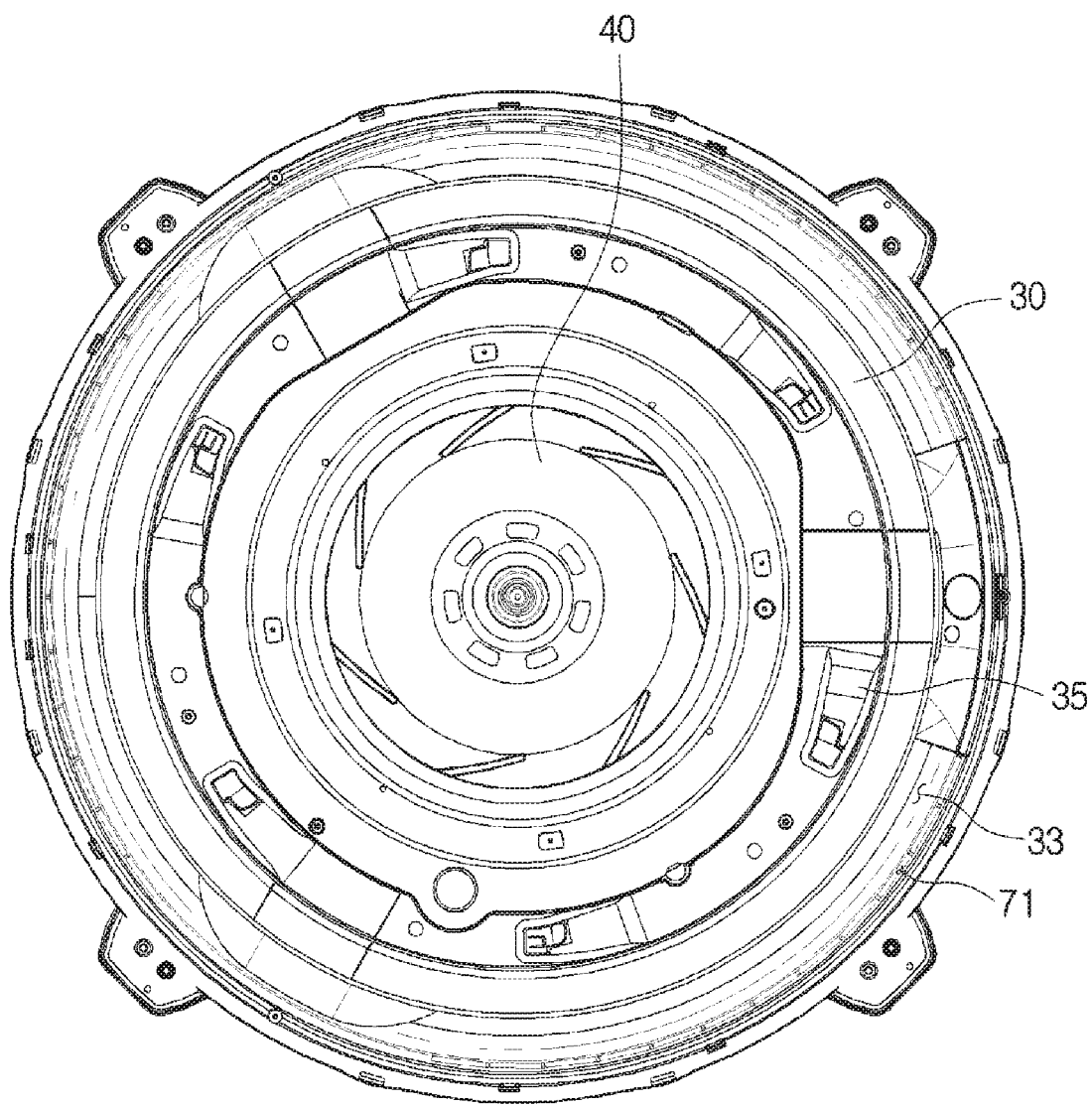
FIG. 7 is a rear view of the air conditioner in accordance with one embodiment of the present disclosure from which the suction panel is removed.
Figure 8:
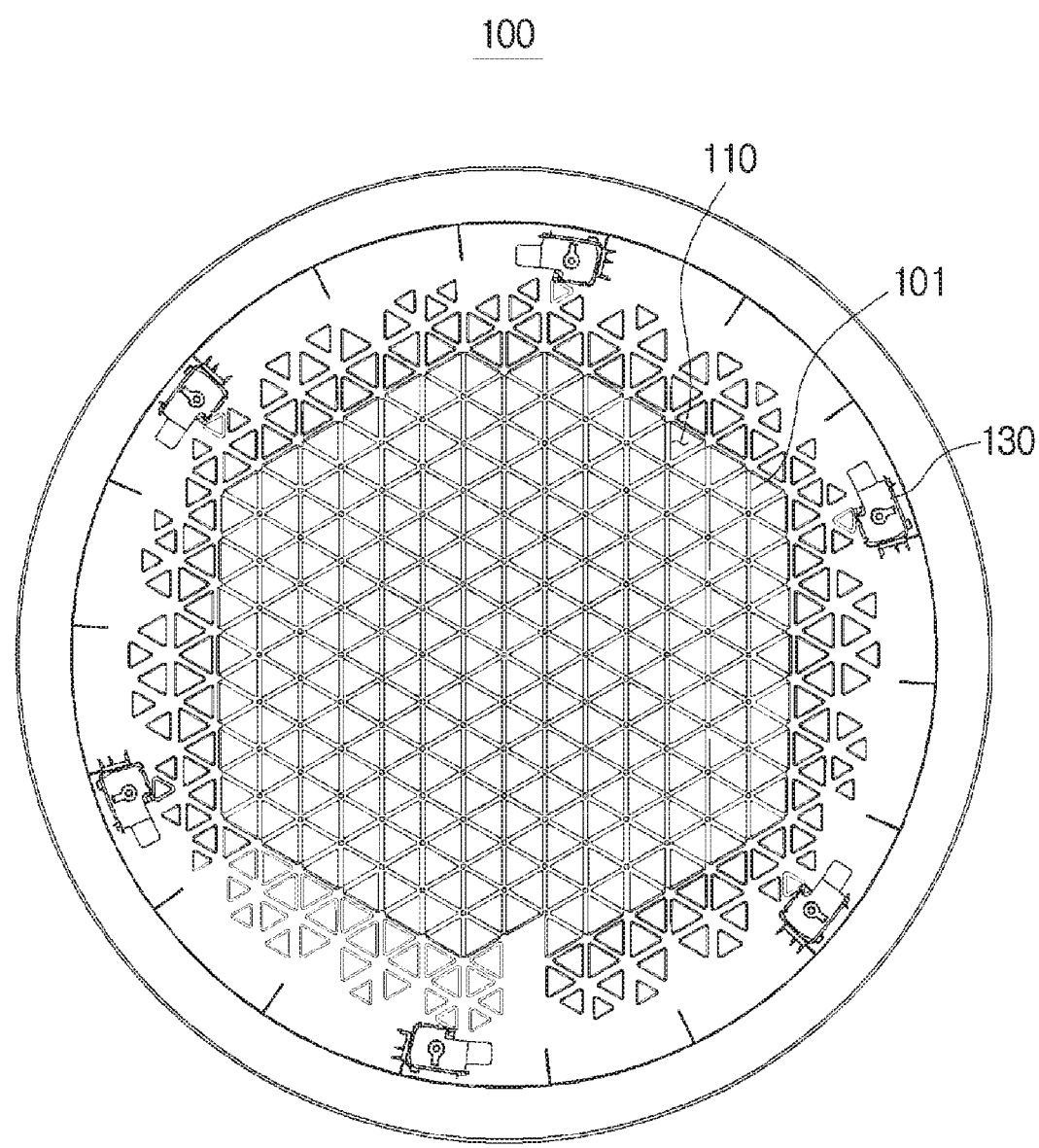
FIG. 8 is a top view of the suction panel of the air conditioner in accordance with one embodiment of the present disclosure.
Figure 9:
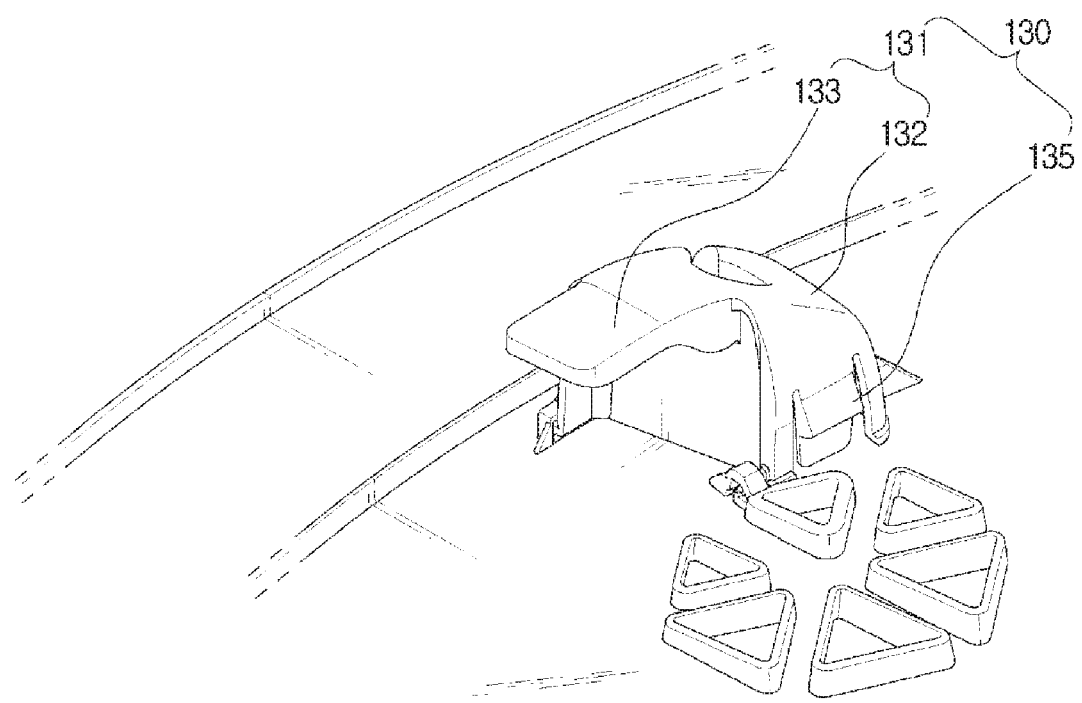
FIG. 9 is a view of a coupling member of the air conditioner in accordance with one embodiment of the present disclosure.
Figure 10:
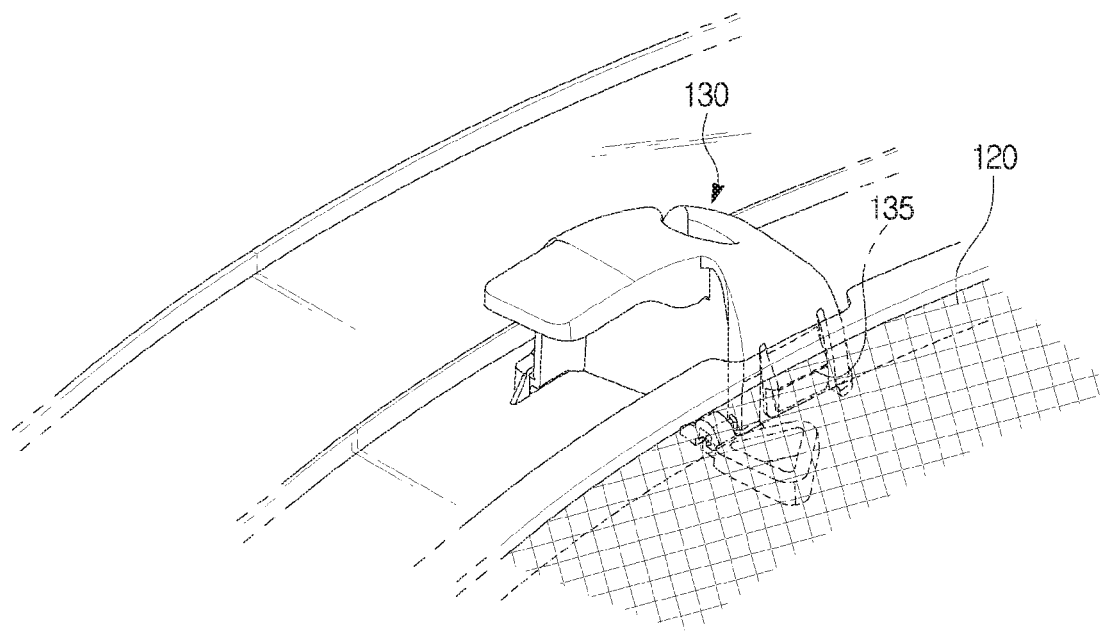
FIG. 10 is a view illustrating a state in which the filter is coupled with the coupling member of the air conditioner in accordance with one embodiment of the present disclosure.
Figure 11:
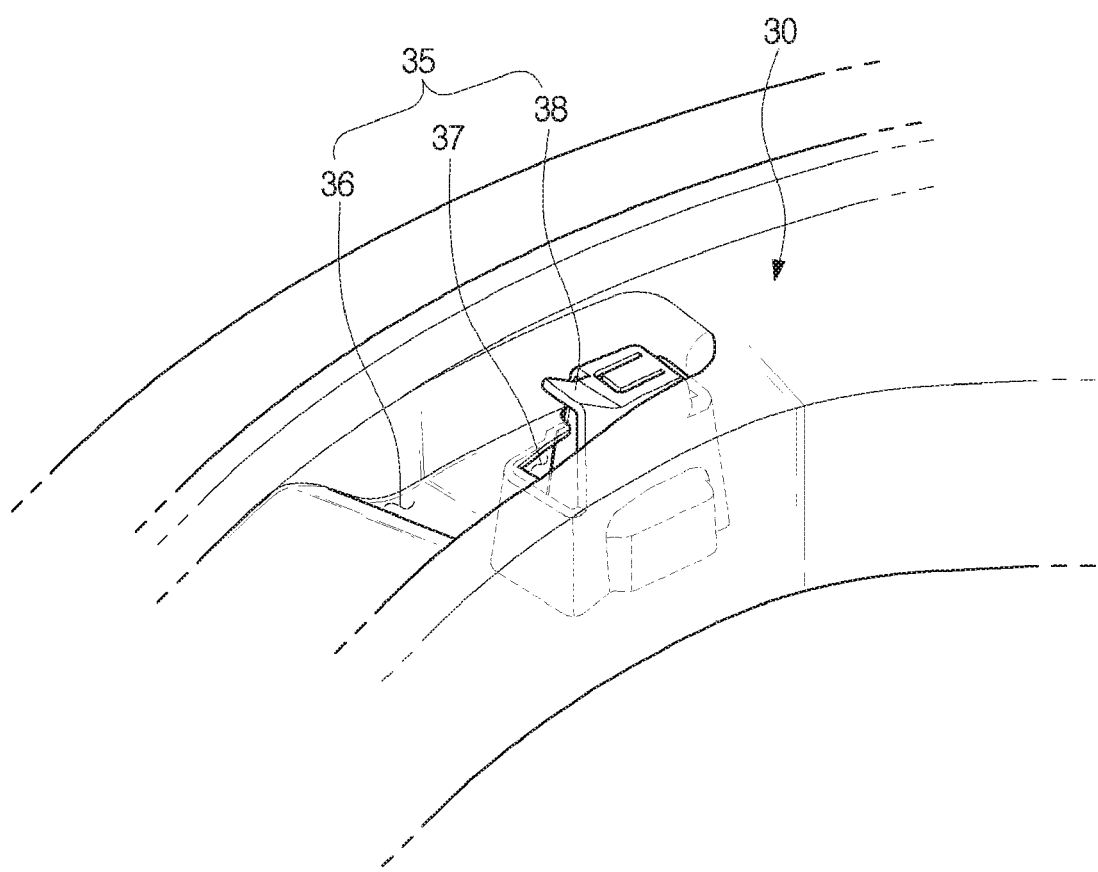
FIG. 11 is a view of the coupling portion of the air conditioner in accordance with one embodiment of the present disclosure.
Figure 12:
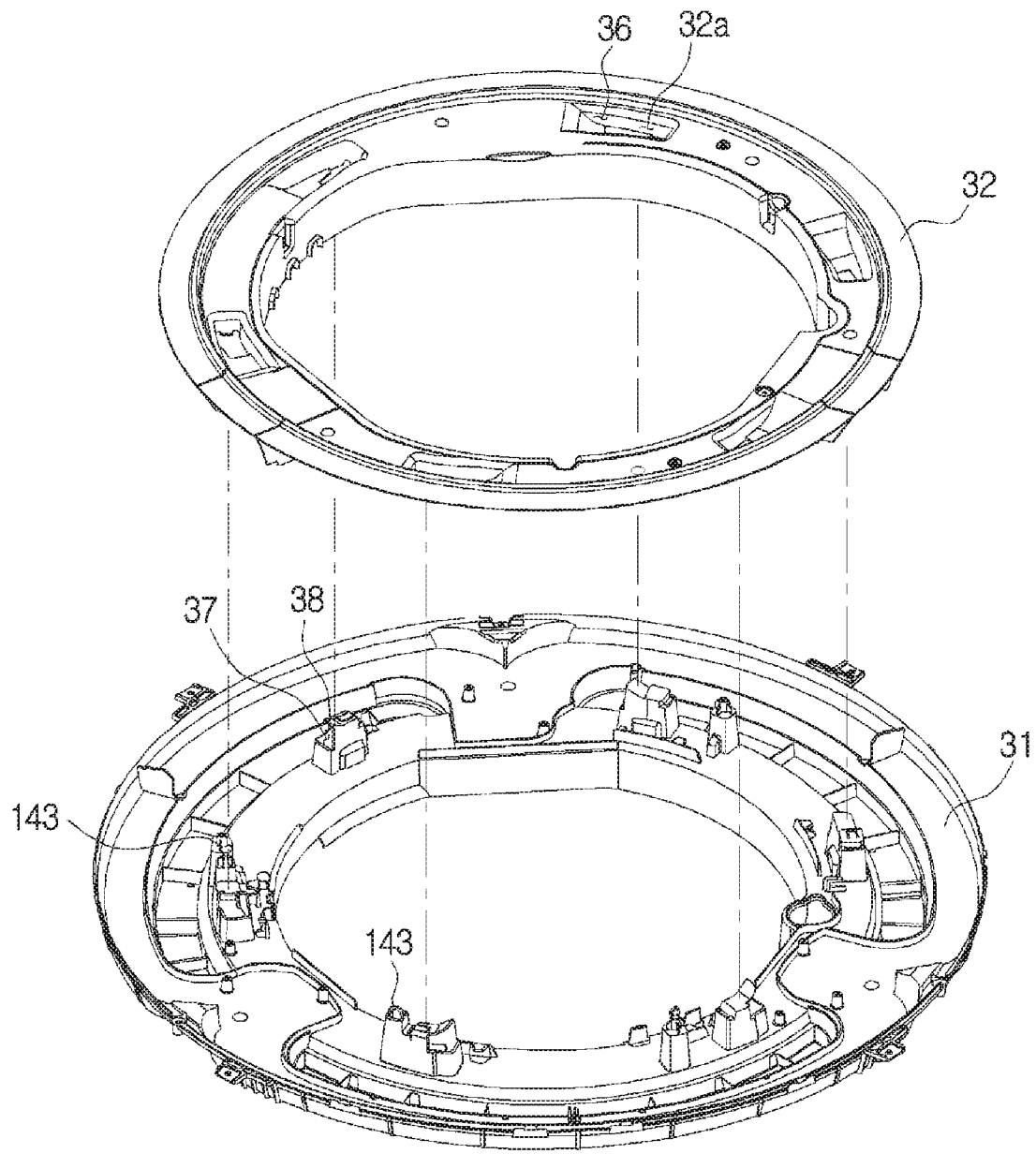
FIG. 12 is an exploded perspective view of the lower housing of the air conditioner in accordance with one embodiment of the present disclosure.
Figure 13:
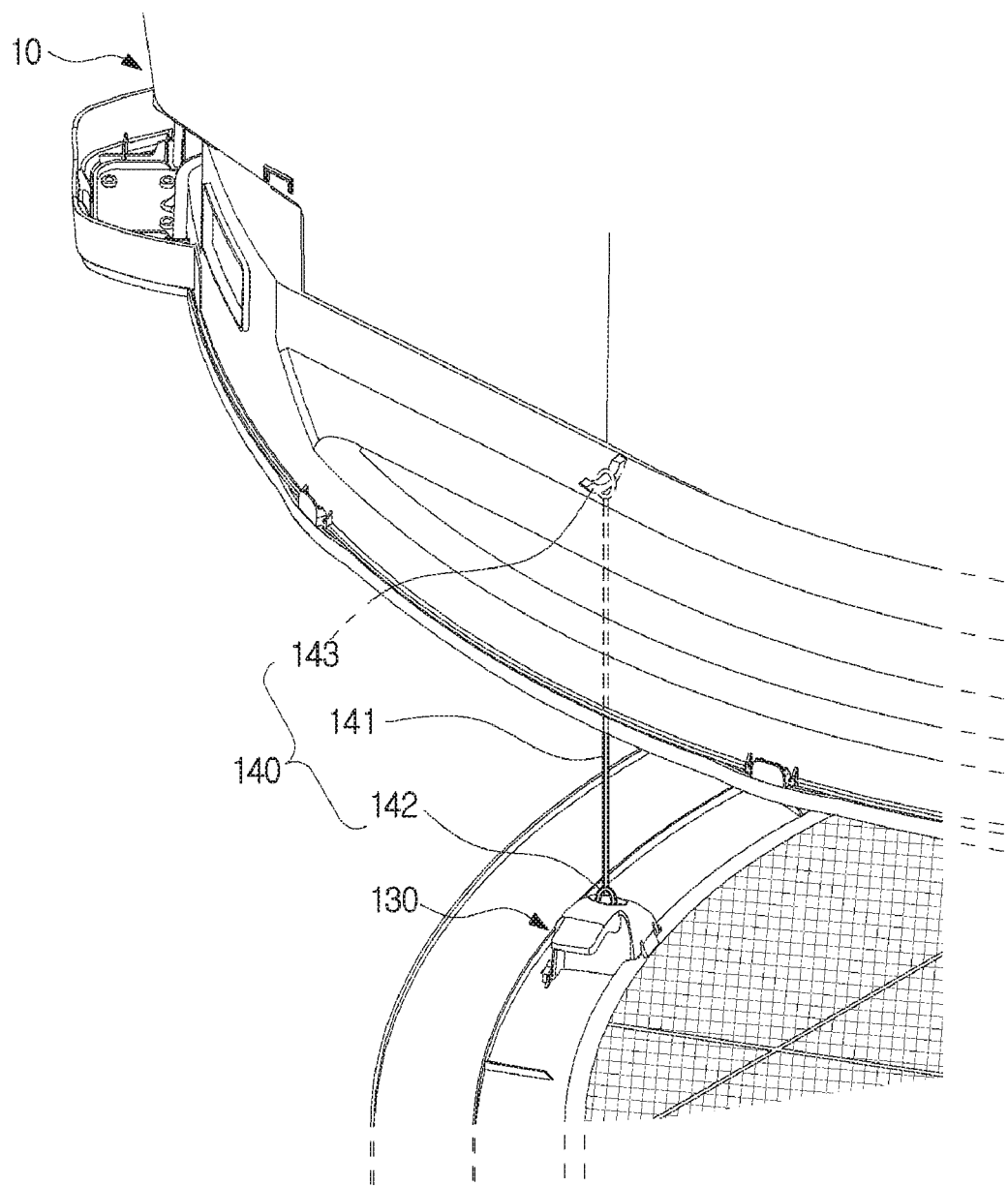
FIG. 13 is a view of a supporting unit of the air conditioner in accordance with one embodiment of the present disclosure.

FIG. 6 is a view illustrating a shape of a separated suction panel of the air conditioner in accordance with one embodiment of the present disclosure. FIG. 7 is a rear view of the air conditioner in accordance with one embodiment of the present disclosure from which the suction panel is removed. FIG. 8 is a top view of the suction panel of the air conditioner in accordance with one embodiment of the present disclosure. FIG. 9 is a view of a coupling member of the air conditioner in accordance with one embodiment of the present disclosure. FIG. 10 is a view illustrating a state in which the filter is coupled with the coupling member of the air conditioner in accordance with one embodiment of the present disclosure. FIG. 11 is a view of the coupling portion of the air conditioner in accordance with one embodiment of the present disclosure. FIG. 12 is an exploded perspective view of the lower housing of the air conditioner in accordance with one embodiment of the present disclosure. FIG. 13 is a view of a supporting unit of the air conditioner in accordance with one embodiment of the present disclosure.

As shown in FIG. 6, the suction panel 100 may be rotated with respect to the lower housing 30 and may be separably coupled with the lower housing 30. That is, when a user applies a force which rotates the suction panel 100 in an axial direction of the air blowing fan 40 or rotates it clockwise or counterclockwise with the vertical direction of the indoor unit 1 of the air conditioner as an axis, the suction panel 100 may be rotated in a force-applied direction and may be separated from or coupled with the lower housing 30.

In accordance with one embodiment of the present disclosure, when the suction panel 100 is rotated clockwise on a rotation axis of the air blowing fan 40 based in a direction in which the user faces the indoor unit 1 of the air conditioner installed in the ceiling L, the suction panel 100 may be coupled with the lower housing 30. When rotated counterclockwise, the suction panel 100 may be separated from the lower housing 30. However, combination and separation are not limited thereto, and combination and separation may be performed by applying the force in the opposite direction.

As shown in FIGS. 7 to 12, a coupling member 130 to be coupled with the lower housing 30 may be provided above the suction panel 100 and a coupling portion 35 provided on a side corresponding to the coupling member 130 may be provided at the lower housing 30.

There may be two or more of each of the coupling member 130 and the coupling portion 35 corresponding thereto, and more preferably, a plurality of such coupling members 130 and a plurality of coupling portions 35 may be arranged on an inner surface adjacent to a rim of the suction panel 100 in a circumferential direction of the suction panel 100.

Hereinafter, a single unit of each of the plurality of coupling members 130 and the plurality of coupling portions 35 will be described. Since the plurality of coupling members 130 and the plurality of coupling portions 35 are provided in the same shapes, a description of the plurality thereof will be omitted.

The coupling member 130 may be provided as a protrusion which protrudes upward. In detail, the coupling member 130 may include a first hook 131 inserted into and supported by the coupling portion 35.

The first hook 131 may include a guide surface 132, which guides the first hook 131 to be inserted into the coupling portion 35 and has a round shape, and an insertion protrusion 133, which laterally extends from the guide surface 132 and is inserted into and hook-coupled with the coupling portion 35.

The coupling portion 35 may be concavely formed inside the lower housing 30 to allow the first hook 131 to be inserted into the lower housing 30. In detail, the coupling portion 35 may include a guide groove 36 provided to be in contact with the insertion protrusion 133 and the guide surface 132 while being coupled with the first hook 131 to allow the insertion protrusion 133 to be inserted into the coupling portion 35, an insertion groove 37 into which the guided insertion protrusion 133 is inserted, and a supporting step 38 with which the insertion protrusion 133 inserted into the insertion groove 37 is hook-coupled to be supported thereby.

The guide groove 36 may allow the coupling member 130 to be easily inserted into the coupling portion 35 when the user couples the suction panel 100 with the lower housing 30. For this, the guide groove 36 may have a larger width than a width of the guide surface 132, and may be concavely provided.

Also, the guide groove 36 may extend toward the insertion groove 37 in a curved shape to allow the insertion protrusion 133 and the guide surface 132 to be easily moved to the insertion groove 37 while in contact with each other.

As described above, when the user rotates the suction panel 100 clockwise, the insertion protrusion 133 may be guided by the guide groove 36, inserted into the insertion groove 37, and hook-coupled with the supporting step 38, thereby allowing the suction panel 100 to be coupled with the lower housing 30.

On the other hand, when the user rotates the suction panel 100 counterclockwise, the insertion protrusion 133 may be separated from the supporting step 38 and sequentially withdrawn from the insertion groove 37 and the guide groove 36, thereby allowing the suction panel 100 to be separated from the lower housing 30.

When the suction panel 100 is provided as a circular shape like one embodiment of the present disclosure, since the user may separate and couple the suction panel 100 from and with the housing 10 by rotating the circular suction panel 100, the suction panel 100 may be intuitively detached or attached using the circular shape, thereby providing convenience to the user.

The circular suction panel 100 may not only be applied to the indoor unit 1 of the air conditioner including the heat exchanger 80 provided in an annular shape like in the embodiment of the present disclosure but also be applied to cases of the heat exchanger 80 provided in a quadrangular shape or in various shapes and may be separated from the housing 10 through rotation and recoupled with the housing 10 through rotation as described above.

As shown in FIG. 12, the insertion groove 37 and the supporting step 38 may be provided at the first lower housing 31 and the guide groove 36 may be provided at the second lower housing 32. This is to provide rigidity against a long-time stress which may occur at the insertion groove 37 and the supporting step 38 when the suction panel 100 is hook-coupled for a long time.

Three of the first lower housings 31, as shown in FIG. 5, may be separably formed. However, in FIG. 12, for convenience of description, among a plurality of such lower housings 31, only one first lower housing 31 disposed above is shown while two other first lower housings 31 are omitted.

The first lower housing 31, which will be described below, is the one first lower housing 31 disposed above shown in FIG. 12 among a plurality of first lower housings 31 shown in FIG. 5. However, the plurality of first lower housings 31, unlike one embodiment of the present disclosure, may be separably provided, but are not limited thereto, and may be injection-molded as a single housing.

The first lower housing 31 may be coupled with the drain tray 90 inside the upper housing 20 to provide rigidity against gravity. However, since the second lower housing 32 is a component which covers the first lower housing 31 at the lower side thereof and is supported by the first lower housing 31, rigidity thereof against a stress may be lower than that of the first lower housing 31.

Accordingly, the second lower housing 32 may include the guide groove 36 and a through hole 32a to expose the insertion groove 37 and the supporting step 38 below the lower housing 30.

However, when the second lower housing 32 has a certain level of rigidity, the insertion groove 37 and the supporting step 38 may be integrally provided at the second lower housing 32. Here, the lower housing 30 may not include the through hole 32a.

The coupling member 130 may include a second hook which faces inward in the radial direction of the suction panel 100. In detail, the second hook 135 may be provided on a side of the coupling member 130, which extends toward the guide surface 132, and may be provided toward a central portion of a radius of the suction panel 100.

As described above, the filter 120 may be disposed on an upper surface of the suction panel 100 at which an outer circumferential surface of the filter 120 may be hook-coupled with the second hook 135 to be supported by the suction panel 100.

As the second hook 135 is provided on one side of the coupling member 130, the suction panel 100 does not need an additional component for supporting a filter, thereby simplifying a process and reducing manufacturing costs.

The user may rotate the suction panel 100 to separate it from the housing 10 and then may easily separate the filter 120 from the suction panel 100 by pressurizing the filter 120 coupled with the second hook 135.

Since the indoor unit 1 of the air conditioner is embedded in the ceiling, when the user separates the suction panel 100 from the ceiling, a safety accident such as falling of the suction panel 100 may occur due to a mistake of the user. To prevent this, the suction panel 100 may include a supporting unit 140 provided to allow the suction panel 100 to be supported by the housing 10 while the suction panel 100 is separated from the housing 10.

The supporting unit 140 may connect the upper side of the suction panel 100 with the lower side of the lower housing 30 to allow the suction panel 100 to be supported by the lower housing 30 at a certain interval therebetween after being separated from the lower housing 30.

As shown in FIG. 13, the supporting unit 140 may include a connecting member 141 which connects the suction panel 100 with the lower housing 30, a first connecting groove 142 provided at the suction panel 100, and a second connecting groove 143 provided at the lower housing 30.

The connecting member 141 may be formed of a material including flexibility such as a wire, and may be disposed to be bent between the suction panel 100 and the lower housing 30 when the suction panel 100 is coupled with the lower housing 30.

The connecting member 141 may allow the suction panel 100 to vertically extend due to tension generated between the lower housing 30 and the suction panel 100 and to be supported by the lower housing 30 when the suction panel 100 is separated.

The connecting member 141 may include a material having rigidity capable of supporting gravity acting on the suction panel 100.

The first connecting groove 142 may be formed at the suction panel 100 and coupled with one side of the connecting member 141. In detail, the first connecting groove 142 may be provided at one side of the guide surface 132 of the coupling member 130, but is not limited thereto, and may be provided at one side of the upper surface of the suction panel 100.

The second connecting groove 143 may be formed at the lower side of the lower housing 30 and may be coupled with the other side of the connecting member 141. The second connecting groove 143, as shown in FIG. 12, like the insertion groove 37 and the supporting step 38, may extend from the first lower housing 31 and may protrude below the second lower housing 32, but is not limited thereto, and may be provided at the second lower housing 32.

Hereinafter, a supporting unit 240 in accordance with another embodiment of the present disclosure will be described. Hereinafter, since components other than a suction panel 200 and the supporting unit 240 to be described below are identical to components of one embodiment described above, a description thereof will be omitted.

Figure 14:
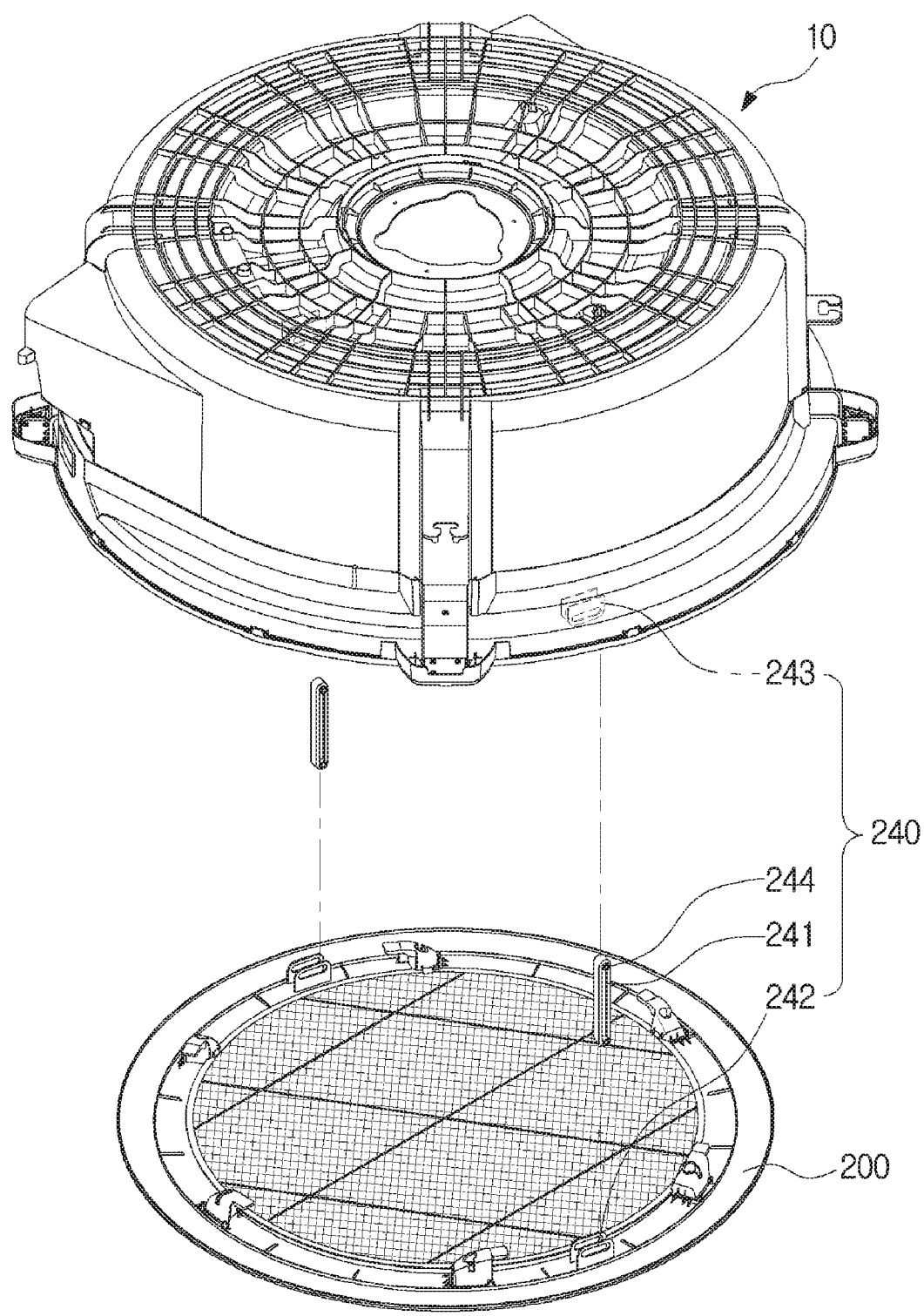
FIG. 14 is an exploded perspective view of a supporting unit of an air conditioner in accordance with another embodiment of the present disclosure.
Figure 15:
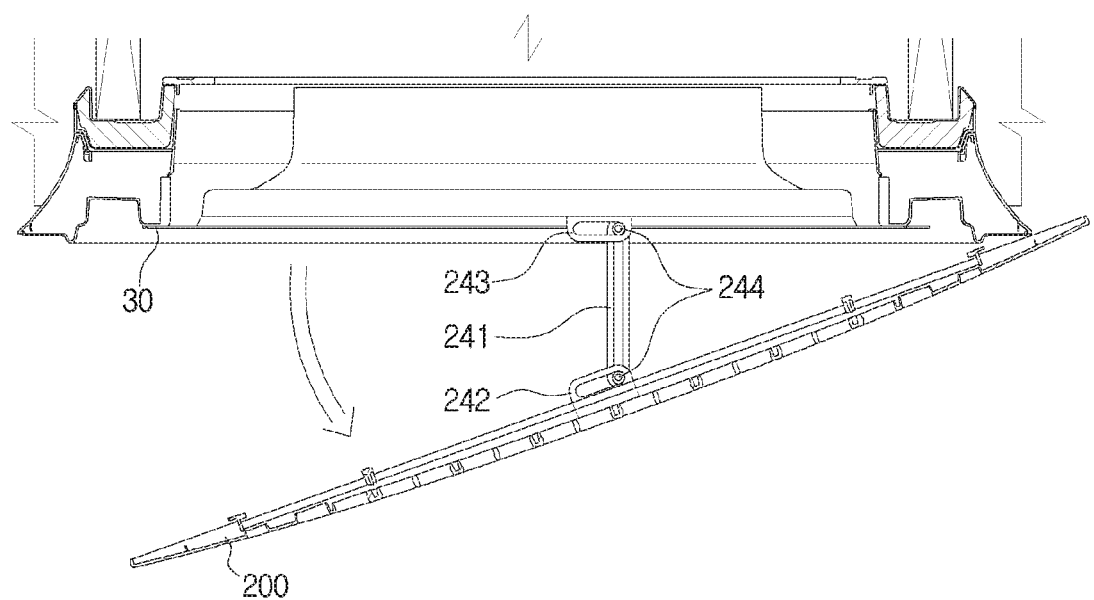
FIG. 15 is a side cross-sectional view schematically illustrating the air conditioner in accordance with another embodiment of the present disclosure.
Figure 16:
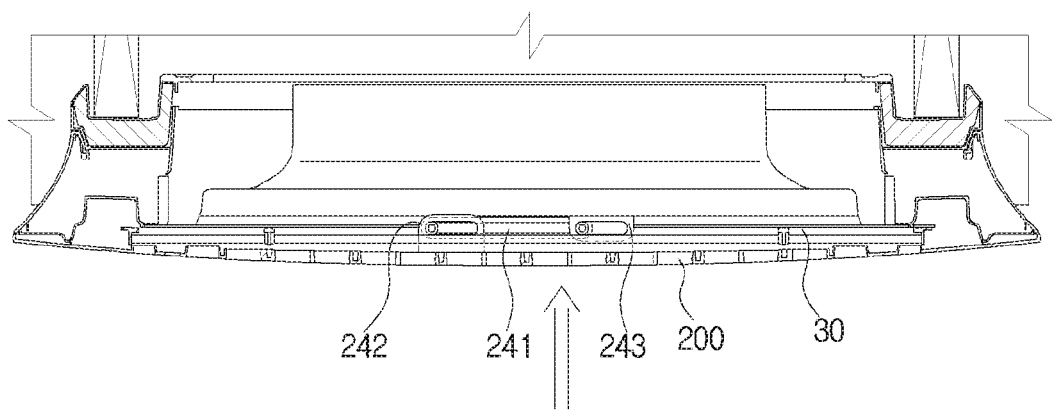
FIG. 16 is a side cross-sectional view schematically illustrating a state in which a suction panel of the air conditioner in accordance with another embodiment of the present disclosure is coupled with a housing.

FIG. 14 is an exploded perspective view of a supporting unit of an air conditioner in accordance with another embodiment of the present disclosure. FIG. 15 is a side cross-sectional view schematically illustrating the air conditioner in accordance with another embodiment of the present disclosure. FIG. 16 is a side cross-sectional view schematically illustrating a state in which a suction panel of the air conditioner in accordance with another embodiment of the present disclosure is coupled with a housing.

As shown in FIG. 14, the supporting unit 240 may include a link member 241 which connects the lower housing 30 with the suction panel 200, a first slide slot 242 disposed at the suction panel 200, and a second slide slot 243 disposed at the lower housing 30.

The link member 241 may slide toward and be rotatably coupled with each of the lower housing 30 and the suction panel 200.

Slide protrusions 244 which are inserted into the first and second slide slots 242 and 243 and slide may be provided at both ends of the link member 241.

The slide protrusions 244 may slide in the first and second slide slots 242 and 243 when the suction panel 200 is rotated, and may rotate with respect to the first and second slide slots 242 and 243 to allow the link member 242 to pivot when the suction panel 200 is separated.

As shown in FIG. 16, when the suction panel 200 is coupled with the lower housing 30, the link member 241 may be provided between the suction panel 200 and the lower housing 30 while being disposed in a direction perpendicular to a vertical direction.

After that, the slide protrusions 244 may slide in the first and second slide slots 242 and 243 in a direction being pressurized when the suction panel 200 is rotated and may slide according to rotation of the suction panel 200.

When the rotation of the suction panel 200 is finished, the coupling member 130 is withdrawn from the coupling portion 35 to be separable. Here, the link member 241 may support the suction panel 200 while being disposed toward the vertical direction to support the suction panel 200 at a certain interval from the lower housing 30.

The slide protrusions 244 rotate while being inserted into the first and second slide slots 242 and 243 to allow the link member 241 to be disposed in the vertical direction. The slide protrusions 244 may not only rotate but also continuously slide in the first and second slide slots 242 and 243 when the suction panel 200 is separated.

The suction panel 200 may be supported by the lower housing 30 while being spaced apart as much as a length of the link member 241.

Hereinafter, a suction panel 300 in accordance with another embodiment of the present disclosure will be described. Hereinafter, since components in addition to the suction panel 300, a coupling member 330, and a supporting unit 340 to be described below are identical to components of one embodiment described above, a description thereof will be omitted.

Figure 17:
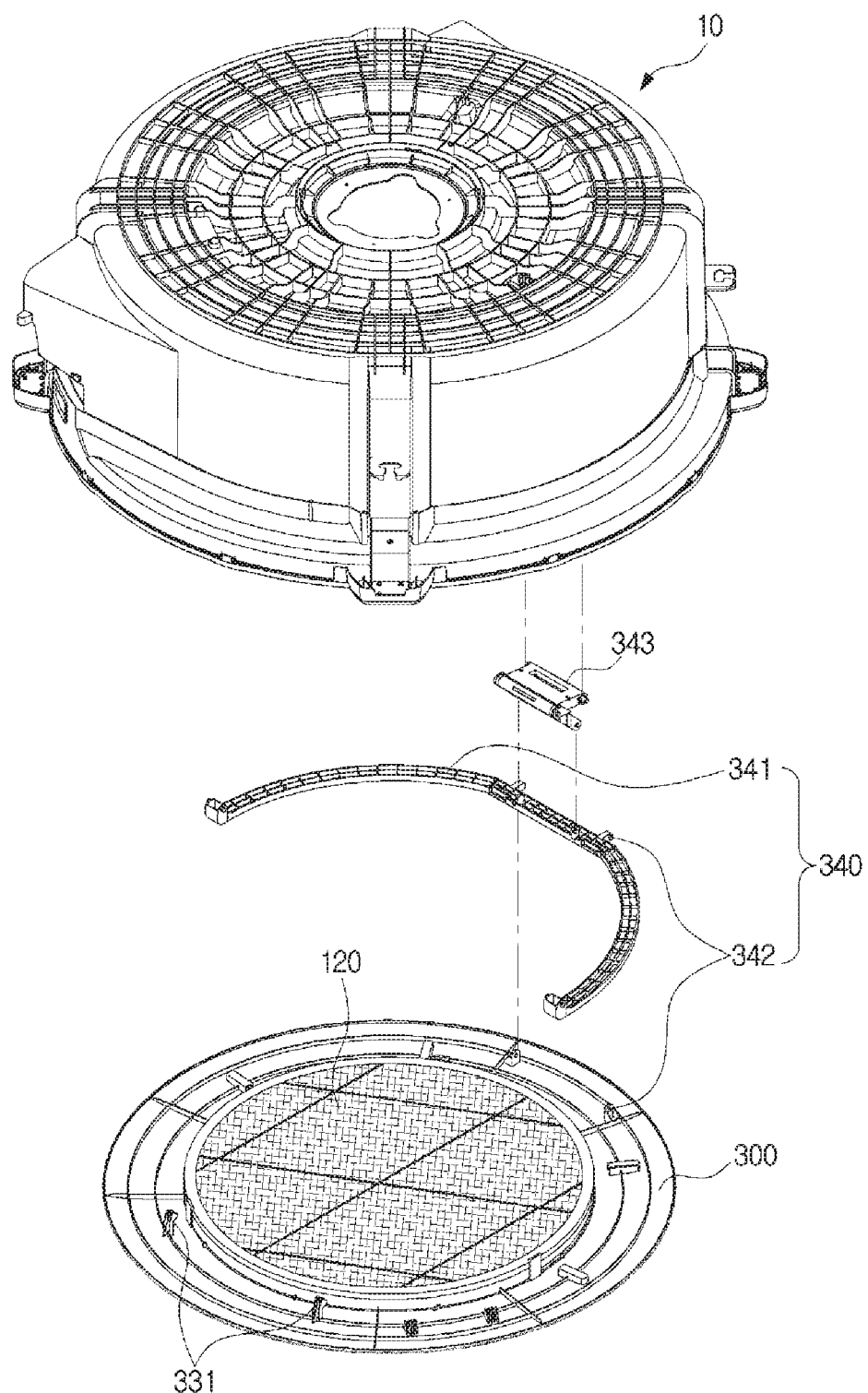
FIG. 17 is an exploded perspective view of a supporting unit of an air conditioner in accordance with another embodiment of the present disclosure.
Figure 18:
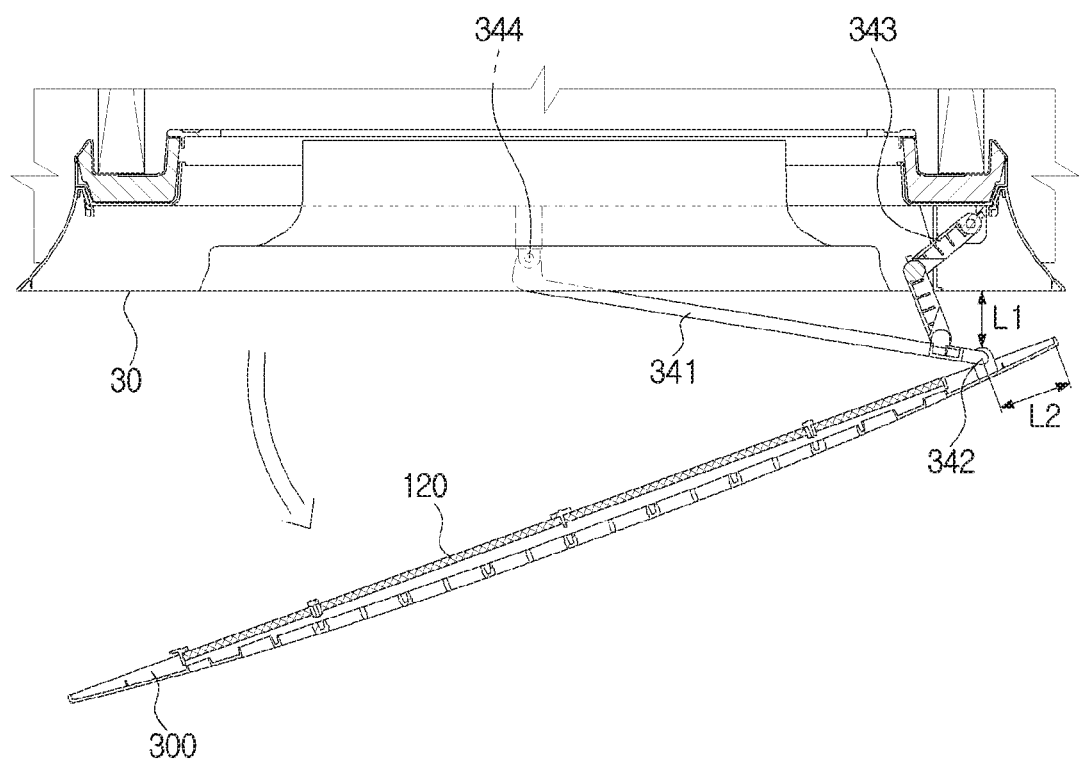
FIG. 18 is a side cross-sectional view schematically illustrating a suction panel of the air conditioner in accordance with another embodiment of the present disclosure when being separated.
Figure 19:
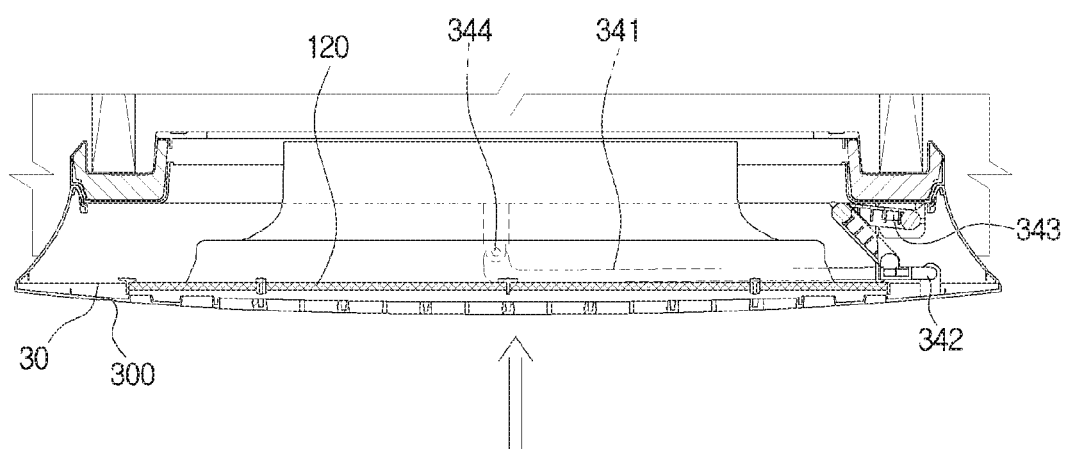
FIG. 19 is a side cross-sectional view schematically illustrating the suction panel of the air conditioner in accordance with another embodiment of the present disclosure when being coupled.

FIG. 17 is an exploded perspective view of a supporting unit of an air conditioner in accordance with another embodiment of the present disclosure. FIG. 18 is a side cross-sectional view schematically illustrating a suction panel of the air conditioner in accordance with another embodiment of the present disclosure when being separated. FIG. 19 is a side cross-sectional view schematically illustrating the suction panel of the air conditioner in accordance with another embodiment of the present disclosure when being coupled.

As shown in FIG. 17, the suction panel 300 may be rotated in a direction perpendicular to the rotation axis of the air blowing fan 40 as a rotation axis to be separated from and coupled with the housing 10. In detail, when the user pressurizes the suction panel 300 in a lower-side direction of the indoor unit 1 of the air conditioner, the suction panel 300 may rotate in the lower-side direction, which is the direction being pressurized, and may be separated from the lower housing 30.

That is, unlike a method of pressurizing the suction panel 100,200 by the user in a circumferential direction of the suction panel 100,200 in accordance with one embodiment of the present disclosure shown in FIGS. 6 to 16, the suction panel 300,400 in accordance with another embodiment of the present disclosure shown in FIGS. 17 to 19, and 20 to 22 may be pressurized downward to be separated from the lower housing 30 and may be pressurized upward to be coupled with the lower housing 30.

The coupling member 330 which connects the suction panel 300 with the lower housing 30 for coupling and separating them with or from each other may be provided between the suction panel 300 and the lower housing 30.

The coupling member 330 may include a hook portion 331 provided at the suction panel 300 and a hook supporting portion (not shown) provided at the lower housing 30 to allow the hook portion 331 to be inserted and supported.

Two such hook portions 331 may be provided as shown in FIG. 17, but the hook portions are not limited thereto, and may be provided as a single hook portion or three or more hook portions. The hook portion 331 may be inserted into and hook-coupled with the hook supporting portion when the suction panel 300 is coupled with the lower housing 30.

When the user pressurizes the suction panel 300 downward, the hook portion 331 may depart from the hook supporting portion in such a way that hook-coupling may be released and the suction panel 300 may be rotated downward.

The supporting unit 340 may include a link member 341 which supports the suction panel 300 at a certain interval from the lower housing 30 to allow the suction panel 300 to be rotated while being spaced apart at the certain interval from the lower housing 30, a rotation-coupling portion 342 provided to allow the suction panel 300 to be vertically rotated, a rotating portion 344 which allows the link member 341 to be rotatable with respect to the lower housing 30, and a hinge member 343 which limits a movement of the link member 341 to allow the link member 341 to support the suction panel 300 while maintaining the certain interval.

The link member 341 may include an annular shape corresponding to a rim of the suction panel 300. In detail, the link member 341 may be formed in an annular shape of a semicircular shape of the suction panel 300.

Rotating portions 344 to be coupled with the lower housing 30 may be provided at both ends of the annular shape of the semicircular shape of the link member 341 to allow the link member 341 to be rotatably coupled with the lower housing 30. Also, a rotation-coupling portion 342 to be coupled with the suction panel 300 and provided to allow the suction panel 300 to be rotatably coupled with respect to the link member 341 may be disposed at a central portion of the link member 341.

That is, the link member 341 may be rotatably coupled with each of the lower housing 30 and the suction panel 300.

Accordingly, when the user pressurizes the suction panel 300 downward, the link member 341 may be interconnected with the suction panel 300, may rotate with respect to the lower housing 30, and may be moved below the lower housing 30 together with the suction panel 300. The link member 341 may support the suction panel 300 at an interval from the lower housing 30 as much as a moved distance below the lower housing 30.

The suction panel 300 may be moved by the link member 341 by a certain distance below and may be rotated with respect to the link member 341 by the rotation-coupling portion 342. The suction panel 300 may vertically rotate on the rotation-coupling portion 342 as a rotation axis.

The hinge member 343 may limit a movement of the link member 341 by connecting the lower housing 30 with a center of the link member 341, that is, a portion adjacent to the rotation-coupling portion 342.

The hinge member 343 may be provided between the lower housing 30 and the suction panel 300 while being folded when the suction panel 300 is coupled with the lower housing 30, and may be extended downward while being interconnected with the link member 341 when the suction panel 300 is pressurized downward.

As described above, the hinge member 343 may limit the rotation of the link member 341 to allow the link member 341 to support the suction panel 300 while keeping the certain interval from the lower housing 30.

Here, when a distance between the rotation-coupling portion 342 and the lower housing 30 maintained by the hinge member 343 is referred to as L1 and a distance between an outer circumferential surface of the suction panel 300 and the rotation-coupling portion 342 is referred to as L2, it is necessary that a length of L1 is greater than a length of L2 to allow rotation of the suction panel 300 not to be limited by the lower housing 30 when it is rotating.

Accordingly, the hinge member 343 may support the link member 341 to allow the length of L1 to be greater than the length of L2. That is, it is necessary that the distance between the rotation-coupling portion 342 and the lower housing 30 is at least identical to the length of L2 when the hinge member 343 extends downward by a maximal length.

Unlike the coupling member 130 in accordance with one embodiment of the present disclosure, since the coupling member 330 in accordance with another embodiment of the present disclosure does not include the second hook 135, the filter 120 may be disposed on an upper surface of the suction panel 300 while including coupling components in addition to the coupling member 330. However, the coupling member 330 in accordance with another embodiment of the present disclosure is not limited to the drawings and may include the second hook 135, and accordingly additional may not include additional components.

Here, it is necessary to dispose the coupling member 330 to be in contact with a side on which an outer surface of the filter 120 is disposed. Also, it is necessary to provide at least two coupling members 330 to restrict the outer circumferential surface of the filter 120.

Hereinafter, a suction panel 400 in accordance with another embodiment of the present disclosure will be described. Hereinafter, since components other than the suction panel 400 and a supporting unit 440 to be described below are identical to components of one embodiment described above, a description thereof will be omitted.

Figure 20:
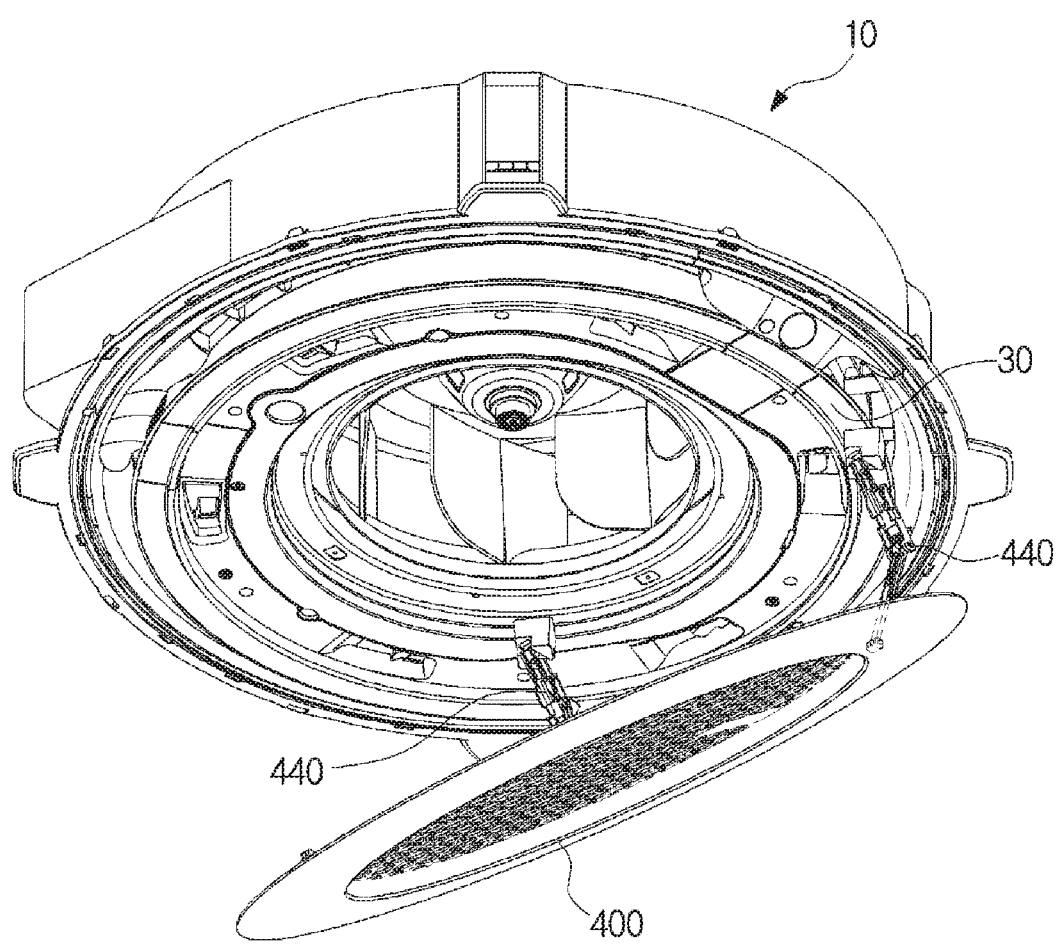
FIG. 20 is a perspective view illustrating a suction panel of an air conditioner in accordance with another embodiment of the present disclosure when being separated.
Figure 21:
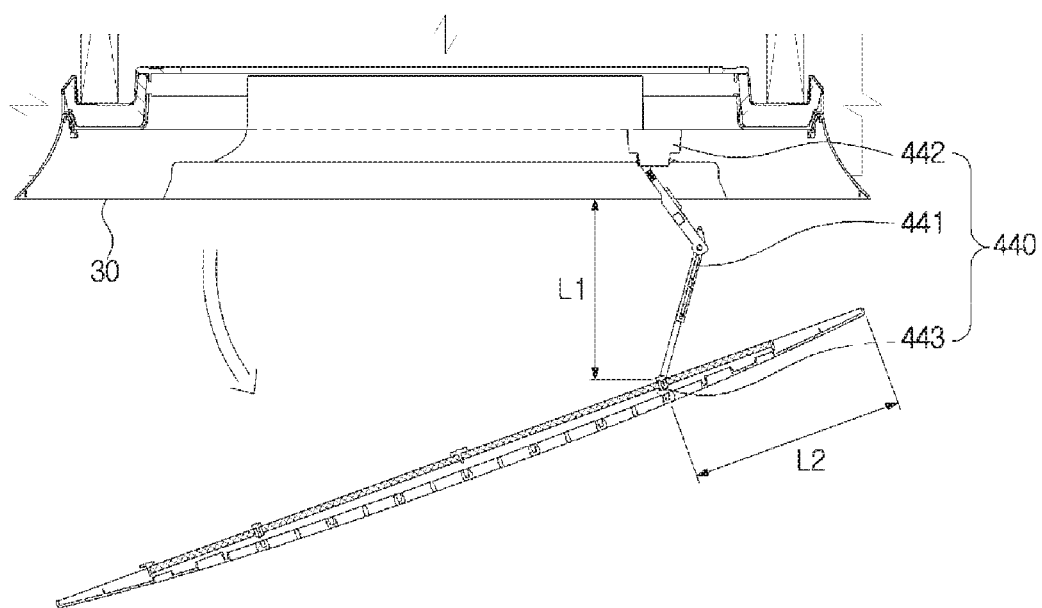
FIG. 21 is a side cross-sectional view schematically illustrating the suction panel of the air conditioner in accordance with another embodiment of the present disclosure when being separated.

FIG. 20 is a perspective view illustrating a suction panel of an air conditioner in accordance with another embodiment of the present disclosure when being separated. FIG. 21 is a side cross-sectional view schematically illustrating the suction panel of the air conditioner in accordance with another embodiment of the present disclosure when being separated.

As shown in FIG. 20, the suction panel 400 may be rotated in a direction perpendicular to the rotation axis of the air blowing fan 40 as a rotation axis to be separated from and coupled with the housing 10. In detail, when the user pressurizes the suction panel 400 in a lower-side direction of the indoor unit 1 of the air conditioner, the suction panel 400 may rotate in the lower-side direction, which is the direction being pressurized, and may be separated from the lower housing 30.

To allow the suction panel 400 to be rotated while being supported by the lower housing 30, the supporting unit 440 may be provided.

The supporting unit 440 may include a hinge member 441 which connects the lower housing 30 with the suction panel 400, a rotating portion 442 which allows the hinge member 441 to be rotatably coupled with the lower housing 30, and a rotation-coupling portion 443 which allows the suction panel 400 to be rotatably coupled with respect to the hinge member 441.

The hinge member 441 may be disposed between the suction panel 400 and the lower housing 30 while being folded when the suction panel 400 is coupled with the lower housing 30, and may be extended downward while being interconnected with the suction panel 400 when the suction panel 400 is pressurized downward.

Here, the hinge member 441 is extended downward and supports the suction panel 400 while being spaced apart therefrom. When a distance between the lower housing 30 on which the hinge member 441 is provided while extended and the rotation-coupling portion 443 is referred to as L1 and a distance between an outer circumferential surface of the suction panel 400 and the rotation-coupling portion 443 is referred to as L2, it is necessary that a length of L1 is greater than a length of L2 to allow rotation of the suction panel 400 not to be limited by the lower housing 30 while rotating.

Accordingly, the hinge member 441 may support the suction panel 400 to allow the length of L1 to be greater than the length of L2. That is, it is necessary that the distance between the rotation-coupling portion 443 and the lower housing 30 is at least identical to the length of L2 when the hinge member 441 is extended downward by a maximal length.

Hereinafter, a suction panel 500 in accordance with another embodiment of the present disclosure will be described. Hereinafter, since components other than the suction panel 500 and a supporting unit 540 to be described below are identical to components of the embodiment described above, a description thereof will be omitted.

Figure 22:
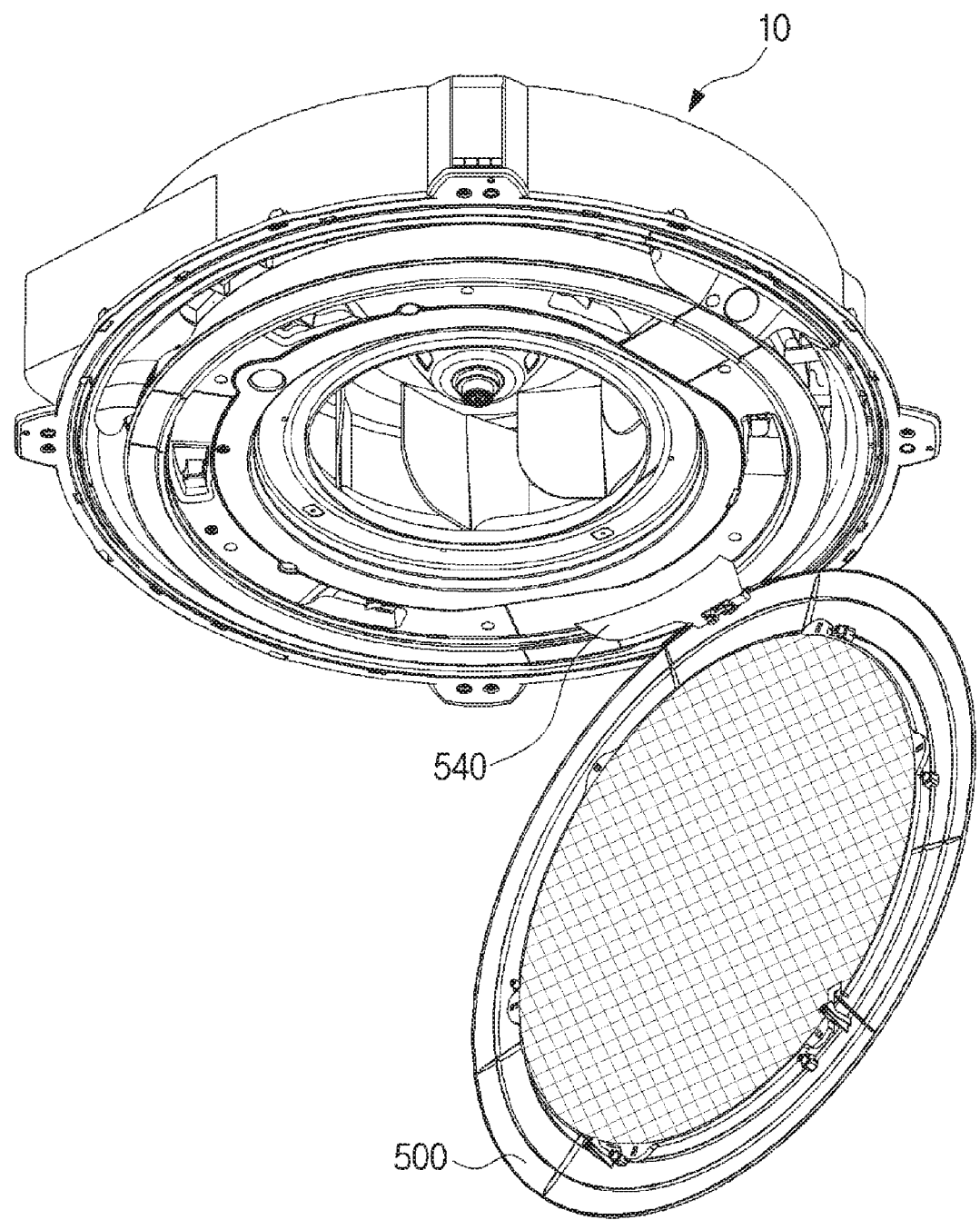
FIG. 22 is a view illustrating a state in which a suction panel of an air conditioner in accordance with another embodiment of the present disclosure when being separated.

FIG. 22 is a view illustrating a suction panel of an air conditioner in accordance with another embodiment of the present disclosure when being separated.

As shown in FIG. 22, the suction panel 500 may be rotated in a direction perpendicular to the rotation axis of the air blowing fan 40 as a rotation axis to be separated from and coupled with the housing 10. In detail, when the user pressurizes the suction panel 500 in a lower-side direction of the indoor unit 1 of the air conditioner, the suction panel 500 may rotate in the lower-side direction, which is the direction being pressurized, and may be separated from the lower housing 30.

To allow the suction panel 500 to be rotated while being supported by the lower housing 30, the supporting unit 540 may be provided.

To allow one side of an outer circumferential surface of the supporting unit 540 to be hinge-coupled with one end of the lower housing 30, the suction panel 500 and the lower housing 30 may be coupled through a hinge portion.

Accordingly, when the user pressurizes the suction panel 500 downward, the suction panel may rotate downward on a hinge axis of the supporting unit 540 as a rotation axis.

Hereinafter, a cover member 600 and a coupling of the cover member 600 with the indoor unit 1 of the air conditioner will be described in detail.

Figure 23:
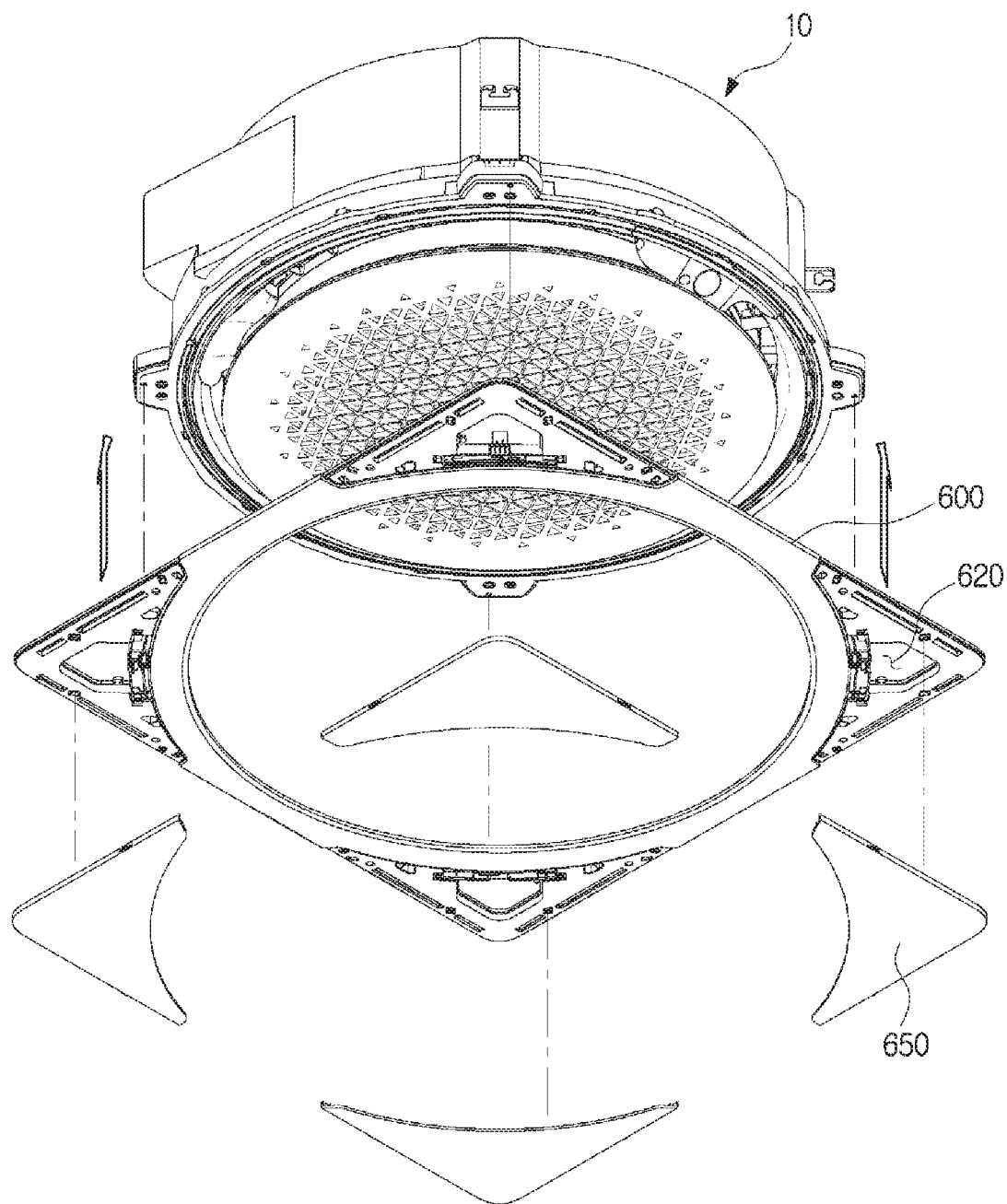
FIG. 23 is a view illustrating a state in which a cover member in accordance with one embodiment of the present disclosure is separated.
Figure 24:
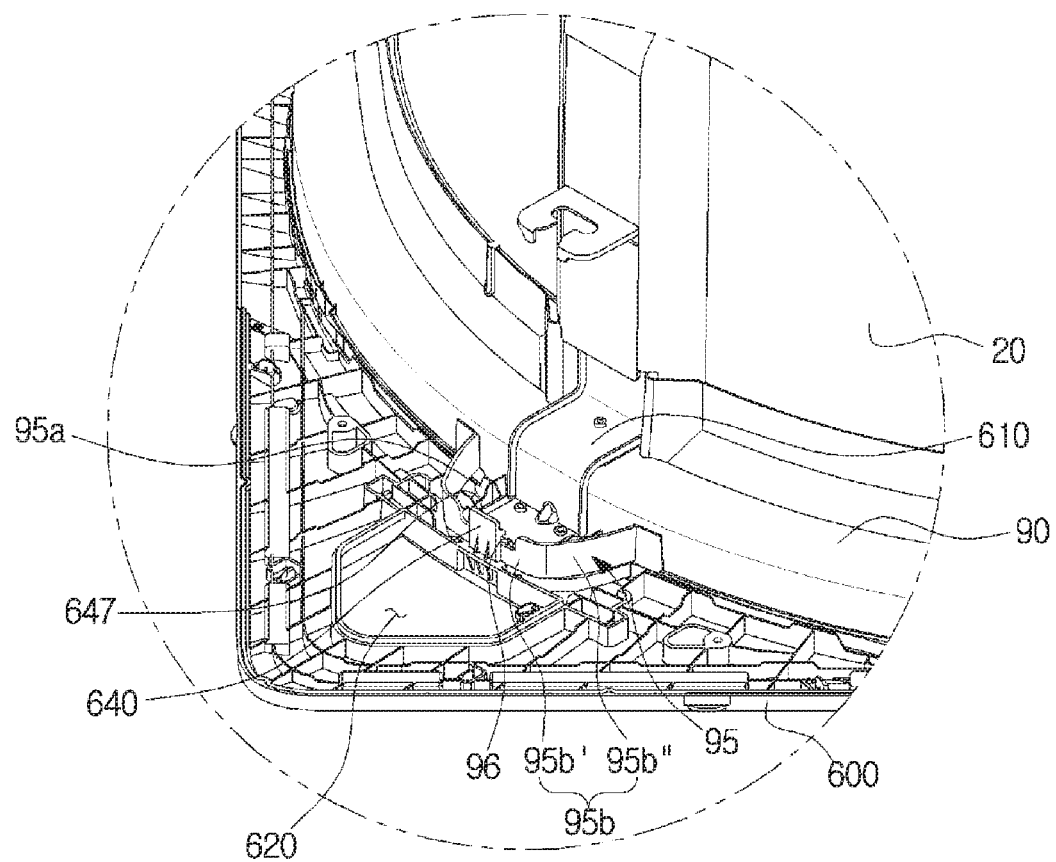
FIG. 24 is a partial view illustrating a state in which the air conditioner in accordance with one embodiment of the present disclosure is coupled.
Figure 25:
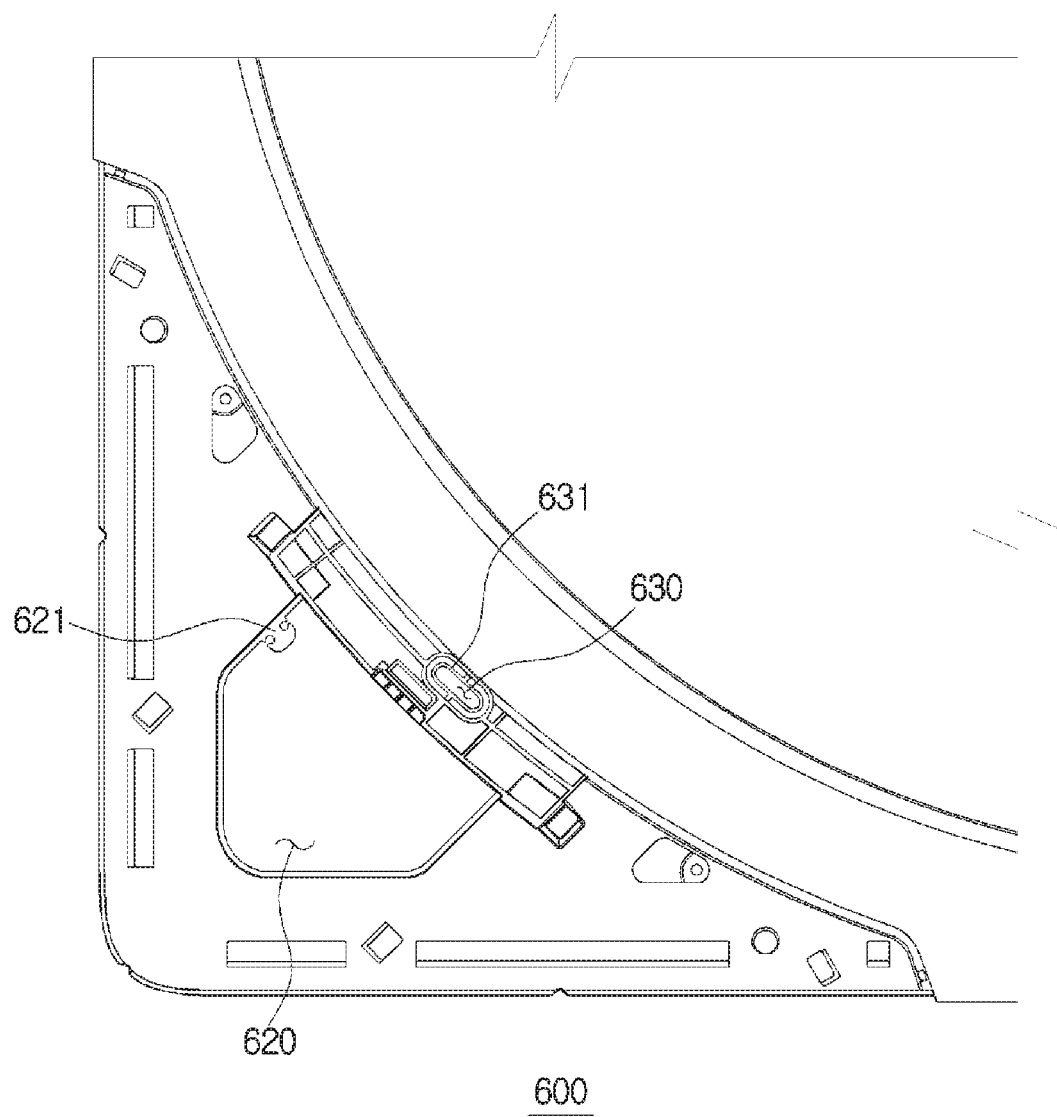
FIG. 25 is a partial enlarged top view of the cover member in accordance with one embodiment of the present disclosure.
Figure 26:
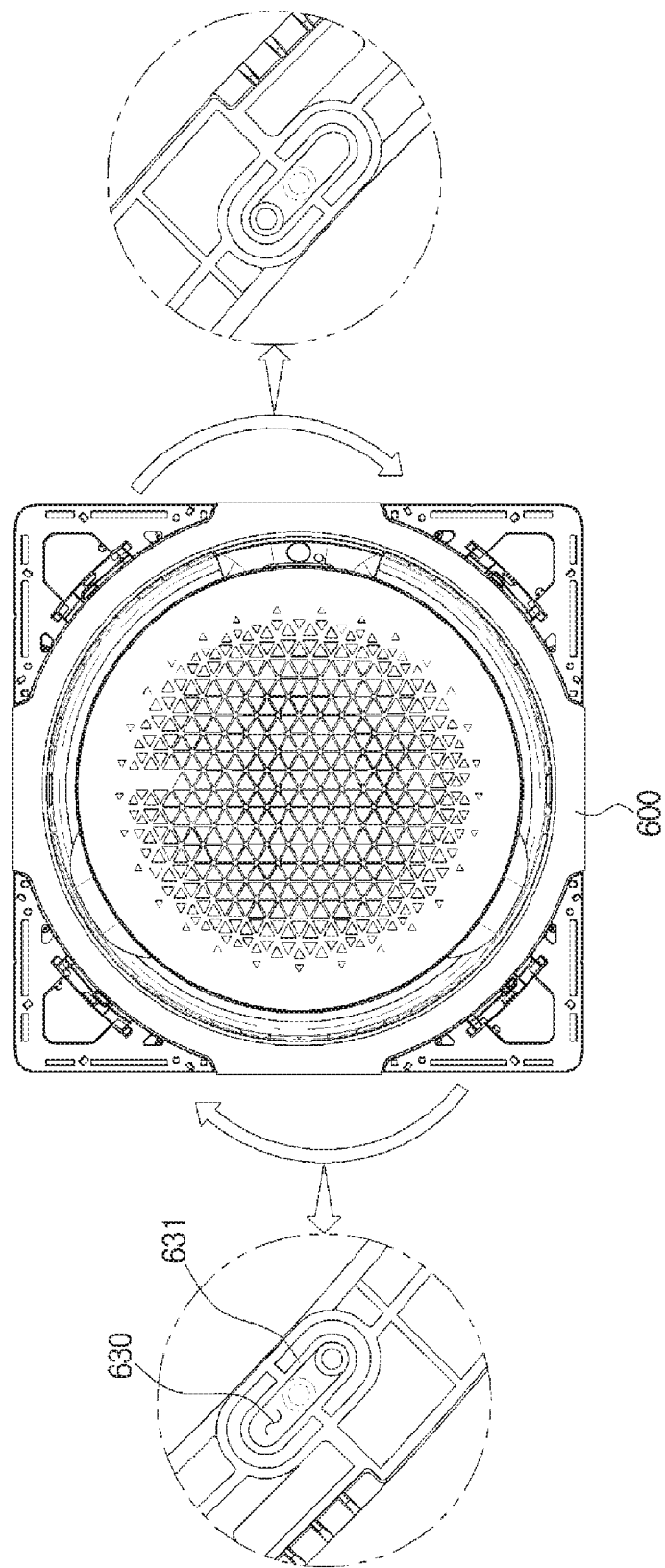
FIG. 26 is a view illustrating a rotation state of the cover member in accordance with one embodiment of the present disclosure.

FIG. 23 is a view illustrating a state in which a cover member in accordance with one embodiment of the present disclosure is separated. FIG. 24 is a partial view illustrating a state in which the air conditioner in accordance with one embodiment of the present disclosure is coupled. FIG. 25 is a partial enlarged top view of the cover member in accordance with one embodiment of the present disclosure. FIG. 26 is a view illustrating a rotation state of the cover member in accordance with one embodiment of the present disclosure.

Referring to FIG. 1, the cover member 600 which covers an outer perimeter of the lower housing 30 may be disposed at a lowermost portion of the indoor unit 1 of the air conditioner. Auxiliary cover members 650 separably disposed from the cover member 600 may be provided at four rectangular corners of the cover member 600.

The auxiliary cover members 650 to be described below may be provided separably from the cover member 600 to cover a coupled portion formed by screw-coupling an auxiliary coupling member 610 with the cover member 600 after the cover member 600 is hook-coupled with the indoor unit 1 of the air conditioner, particularly, with the drain tray 90.

Also, the cover member 600 may include through portions 620 which include openings to allow the user to easily work through the cover member 600 when the indoor unit 1 of the air conditioner is installed in the ceiling at the four rectangular corners, and the auxiliary cover members 650 may cover a coupled portion of the cover member 600 and the indoor unit 1 of the air conditioner and the through portions 620.

That is, the auxiliary cover members 650 may be separated to allow the user to work while the cover member 600 is coupled or the indoor unit 1 of the air conditioner is mounted. When the work is finished, the auxiliary cover members 650 may be coupled with the cover member 600 to cover the four rectangular corners of the cover member 600.

The cover member 600, the lower housing 30, the drain tray 90, and the upper housing 20 are layered from a lower side of the indoor unit 1 of the air conditioner to be coupled.

In the case of a conventional air conditioner, in detail, in the case of a type of air conditioner controlling a discharged air flow using a general blade, a cover member, a drain tray, and a housing may be layered from a lower side. In the case of the air conditioner in accordance with the embodiment of the present disclosure, since the air flow controller is provided below the drain tray instead of including a blade, the number of additionally layered components such as the plurality of lower housings 30 is larger than the conventional air conditioner. Accordingly, it may be difficult to couple respective components.

Particularly, it is difficult to assemble layered components with one another due to the large number thereof. Since each of components is formed of an injection-molded product generally including plastic properties, when components are assembled with one another, they may be easily damaged by contact thereamong even due to a minor shock, thereby deteriorating durability of the indoor unit 1 of the air conditioner.

Accordingly, to overcome this, as shown in FIG. 24, the respective components are not coupled with one another, but may be coupled with the auxiliary coupling member 610 to increase the durability.

The auxiliary coupling member 610 may be extended in a vertical direction of an outer circumferential surface of the indoor unit 1 of the air conditioner, and may include a material having high strength such as steel.

The lower housing 30 and the drain tray 90 may respectively include a first assembling portion 39 and a second assembling portion 95 which protrude outward from the outer circumferential surface. The first assembling portion 39 and the second assembling portion 95 may be layered and coupled with the auxiliary coupling member 610.

The cover member 600 may include a coupling slit 630 to be screw-coupled together with the first assembling portion 39 and the second assembling portion 95 may be provided at each of the four rectangular corners corresponding to the first assembling portion 39 and the second assembling portion 95. This will be described in detail below.

Also, as the auxiliary coupling member 610 is inserted into the upper housing 20, the upper housing 20 may be coupled by the auxiliary coupling member 610.

The cover member 600 may be pressurized toward the indoor unit 1 of the air conditioner and may be coupled with the indoor unit 1 of the air conditioner. In detail, the cover member 600 may be pressurized upward and may be hook-coupled with the second assembling portion 95.

The cover member 600 may include a coupling hook 640 which protrudes toward the drain tray 90, and a recessed portion 96 to be coupled with the coupling hook 640 may be provided at the second assembling portion 95.

The second assembling portion 95 may include a coupling surface 95a, which protrudes in a radial direction of the drain tray 90 and is screw-coupled with the first assembling portion 39 and the auxiliary coupling member 610, and an extension surface 95b, which is extended upward along an outer perimeter of the coupling surface 95a.

The first assembling portion 39 may be disposed at a lower surface of the coupling surface 95a and the auxiliary coupling member 610 may be disposed at an upper surface thereof to be screw-coupled while being layered. The recessed portion 96 may be provided at one side of the extension surface 95b, and may be hook-coupled with the coupling hook 640.

However, the recessed portion 96 is not limited to one embodiment of the present disclosure and may be disposed at the first assembling portion 39. Here, the first assembling portion 39 may include a coupling portion and an extension surface, and the second assembling portion 95 may be disposed on an upper surface of the first assembling portion 39 and may be screw-coupled with the auxiliary coupling member 610 disposed above the first assembling portion 39.

When the cover member 600 is pressurized upward, the coupling hook 640 may be moved upward, may be guided along an upper side of the extension surface 95b, and may arrive at and be hook-coupled with the recessed portion 96.

Due to the coupling hook 640, the user may easily couple the cover member 600 with the indoor unit 1 of the air conditioner only by performing an operation of pressurizing the cover member 600 upward.

In the case of a conventional air conditioner, it is necessary that one user supports a cover member not to fall and another user couples the cover member to fix the cover member, which is inconvenient. The cover member 600 in accordance with one embodiment of the present disclosure may be fixed to the indoor unit 1 of the air conditioner by simply pressurizing the cover member 600 upward.

In a process of coupling the cover member 600, first the auxiliary cover member 650 pressurizes the cover member 600 in a separate state toward the indoor unit 1 of the air conditioner to allow the coupling hook 640 to be hook-coupled with the recessed portion 96.

After that, the user may insert a screw into the coupling slit 630 provided at the cover member 600, and may screw-couple the cover member 600, the first and second assembling portions 39 and 95, and the auxiliary coupling member 610 while they are layered.

Although described below, the coupling slit 630 is slidable with respect to the screw and may adjust an angle of coupling the cover member 600 by rotating the cover member 600. After coupling is completed, the auxiliary cover member 650 may be coupled with the cover member 600, thereby finishing the process of coupling the cover member 600.

When the cover member 600 is separated, the user may separate the auxiliary cover member 650, may remove the screw from the coupling slit 630, and may disassemble a hook-coupled state of the coupling hook 640 through the through portion 620, thereby separating the cover member 600.

Here, even when the screw is removed from the coupling slit 630, it is possible to prevent the cover member 600 from suddenly falling since the cover member 600 is hook-coupled with the drain tray 90.

The coupling hook 640 may include a disassembling rib 647 which allows the user to pressurize one side of the coupling hook 640 to easily disassemble the hook-coupled state. The disassembling rib 647 may be provided to be extended upward from an upper end of the coupling hook 640 to allow the user to easily disassemble hook-coupling by pulling the disassembling rib 647 in the radial direction of the drain tray 90 through the through portion 620.

Although not shown in the drawings, in order to easily disassemble the hook coupling, a holding portion may be provided at one side of the coupling hook 640 and an incised portion may be provided at one side of the cover member 600 corresponding to the holding portion to allow a thin shaft such as a screw driver to pass through the cover member 600 and to arrive at the holding portion.

Here, the user may insert the shaft into the incised portion, may allow the shaft passing through the cover member 600 to be held by the holding portion, and may bend the shaft back in the radial direction of the drain tray 90. Accordingly, the coupling hook 640 may be interconnected with a movement of the shaft and may be bent back in a direction of departing from the recessed portion 96, thereby releasing the hook coupling.

As shown in FIG. 25, the coupling slit 630 may be disposed in an area at which the cover member 600 is covered by the auxiliary cover member 650.

The screw is inserted into the coupling slit 630 to allow the cover member 600 to be screw-coupled with the auxiliary coupling member 610. A longitudinal portion 631 may be provided to allow the coupling slit 630 to be slidable with respect to the screw after the screw is coupled.

In detail, as shown in FIG. 26, after the cover member 600 is screw-coupled with the auxiliary coupling member 610, the user may dispose the cover member 600 by rotating the cover member 600 on the rotation axis of the air blowing fan 40 clockwise or counterclockwise to adjust the angle of coupling the cover member 600

The user may rotate the cover member 600 to adjust verticality and horizontally between a ceiling surface at which the indoor unit 1 of the air conditioner is installed and the cover member 600.

That is, when the cover member 600 is pressurized clockwise or counterclockwise, the coupling slit 630 may reciprocate a distance between one end and the other end of the longitudinal portion 631 with respect to the screw while sliding. Accordingly, the cover member 600 may be rotated as much as a length of the longitudinal portion 631.

Also, when the cover member 600 is rotated, the coupling hook 640 coupled with the recessed portion 96 also may be rotated clockwise or counterclockwise while being interconnected with the cover member 600. Accordingly, a width of the recessed portion 96 may be larger than a width of the coupling hook 640 in order not to limit the rotation of the cover member 600.

A difference between the widths of the recessed portion 96 and the coupling hook 640 may be at least identical to a length of the rotation of the cover member 600 through sliding of the coupling slit 630.

However, since the coupling hook 640 is hook-coupled with the recessed portion 96 before the screw is assembled with the coupling slit 630 and the width of the recessed portion 96 is larger than the width of the coupling hook 640, the cover member 600 may rotate with respect to the housing 10 as much as the difference between the widths of the recessed portion 96 and the coupling hook 640.

Accordingly, the cover member 600 may be rotatably coupled with the housing 10 at a certain interval regardless of whether the screw is inserted into the coupling slit 630.

The cover member 600 may support the auxiliary cover member 650 while being spaced apart using a wire to prevent the auxiliary cover member 650 from falling when the auxiliary cover member 650 is separated.

That is, a wire binding portion 621 capable of binding the wire is provided at one side of the cover member 600 in such a way that one side of the wire is bound to the wire binding portion 621 and the other side of the wire is connected to one side of the auxiliary cover member 650 to prevent the auxiliary cover member 650 from falling while being separated.

In detail, the wire binding portion 621 may protrude toward an inside of the through portion 620. The wire binding portion 621 is formed in a hook shape at the through portion 620 in such a way that the user may easily bind the wire to connect the cover member 600 with the auxiliary cover member using the wire.

Also, the wire binding portion 621 may be integrally injection-molded together with the cover member 600 in a shape extended from one side of the cover member 600 toward the through portion 620. Accordingly, since an additional component for preventing the auxiliary cover member 650 from falling is unnecessary, the number of components for forming the indoor unit 1 of the air conditioner may be reduced, the process may be simplified, and manufacturing costs may be reduced.

Hereinafter, a coupling hook 640' in accordance with another embodiment of the present disclosure will be described. Hereinafter, since components other than the coupling hook 640' to be described below are identical to components of one embodiment described above, a description thereof will be omitted.

Figure 27:
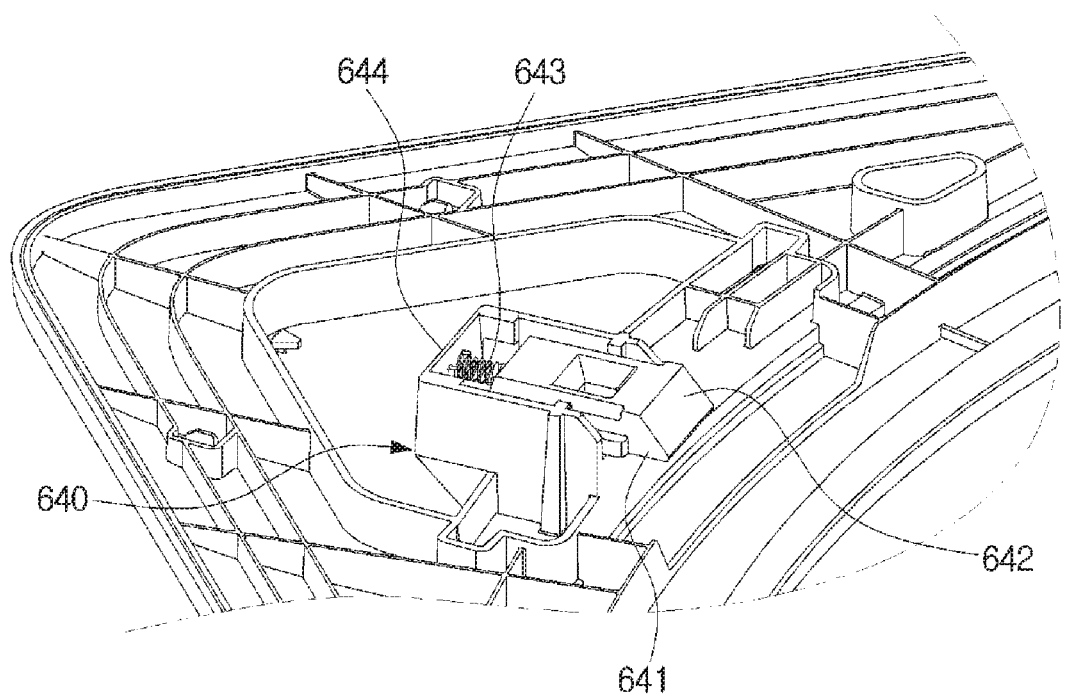
FIG. 27 is a partial enlarged view of a cover member in accordance with another embodiment of the present disclosure.
Figure 28:
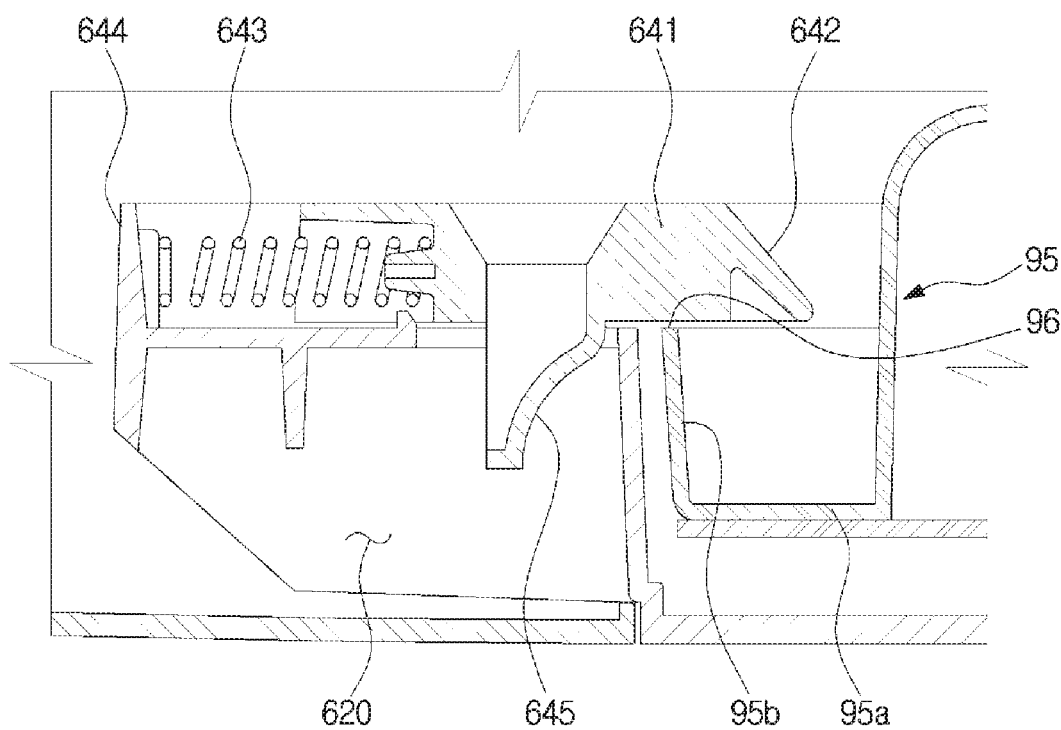
FIG. 28 is a side cross-sectional view illustrating a state in which the cover member in accordance with another embodiment of the present disclosure is separated from the air conditioner.

FIG. 27 is a partial enlarged view of a cover member in accordance with another embodiment of the present disclosure. FIG. 28 is a side cross-sectional view illustrating a state in which the cover member in accordance with another embodiment of the present disclosure is separated from the air conditioner.

As shown in FIG. 27, the coupling hook 640' may be provided in a spring holder shape capable of moving forward and backward in the radial direction of the drain tray 90. A holder 641 of the spring holder is hook-coupled with the recessed portion 96 in such a way that the cover member 600 may be coupled with the indoor unit 1 of the air conditioner.

The coupling hook 640' may include the holder 641 hook-coupled with the recessed portion 96, a guide sloping surface 642 formed on an upper surface of the holder 641 to guide a reciprocating movement of the holder 641 when the holder 641 is in contact with the first and second assembling portions 39 and 95, a spring member 643 which allows the holder 641 to reciprocate, and a supporting panel 644 which supports one side of the spring member 643.

Like the coupling hook 640 in accordance with one embodiment of the present disclosure, when the cover member 600 is pressurized upward, the coupling hook 640' is hook-coupled with the recessed portion 96 to allow the cover member 600 to easily be coupled with the drain tray 90.

When the cover member 600 is pressurized upward, the coupling hook 640' may be in contact with one side of each of the first and second assembling portions 39 and 95 while moving upward. Here, the guide sloping surface 642 is in contact with the one sides of the first and second assembling portions 39 and 95. When the cover member 600 is continuously pressurized upward while the guide sloping surface 642 is in contact with the one sides of the first and second assembling portions 39 and 95, the one sides of the first and second assembling portions 39 and 95 pressurize the holder 641 along the guide sloping surface 642 in the radial direction of the drain tray 90. Accordingly, the spring member 643 is contracted and the holder 641 moves backward in the radial direction of the drain tray 90.

After that, when the holder 641 is disposed at a side of the recessed portion 96 due to continuous upward pressurization, the spring member 643 is disposed while being spaced apart from the first and second assembling portions 39 and 95, which pressurize the guide sloping surface 642, and is extended again, thereby allowing the holder 641 move inwardly forward in the radial direction of the drain tray 90.

As the holder 641 moves forward, a lower surface of the holder 641 and the recessed portion 96 are hook-coupled, thereby coupling the cover member 600 with the drain tray 90.

When the coupling hook 640' is separated from the drain tray 90, the user may release hook-coupling between the coupling hook 640' and the recessed portion 96 by pulling a backward movement protrusion 645 extended downward from the lower surface of the holder 641 in the radial direction of the drain tray 90.

The backward movement protrusion 645 may be disposed at the through portion 620 to be easily gripped by the user through the through portion 620.

Hereinafter, a cover member 700 in accordance with another embodiment of the present disclosure will be described. Hereinafter, since components other than the cover member 700 to be described below are identical to components of one embodiment described above, a description thereof will be omitted.

Figure 29:
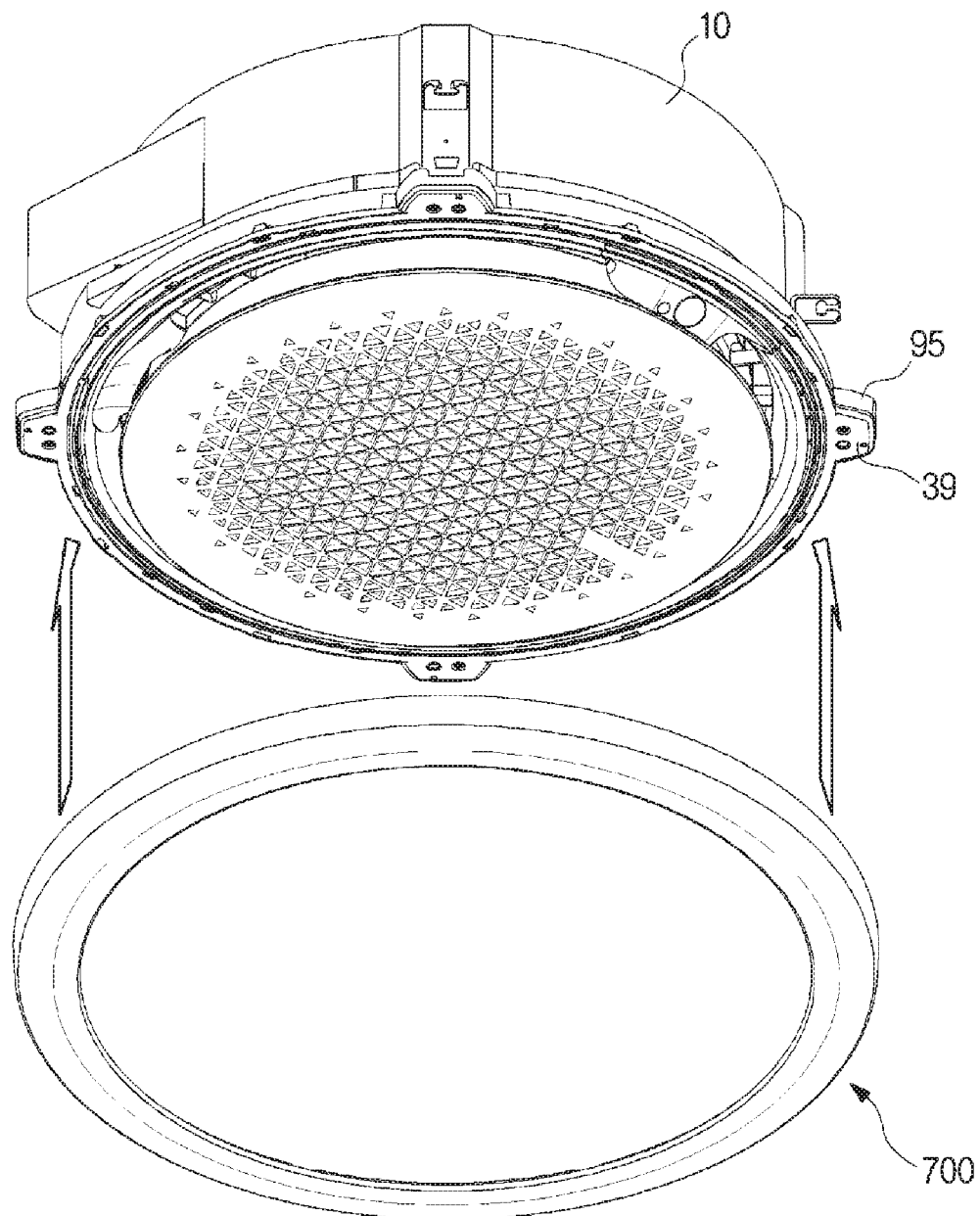
FIG. 29 is a view illustrating a state in which a cover member in accordance with another embodiment of the present disclosure is separated.
Figure 30:
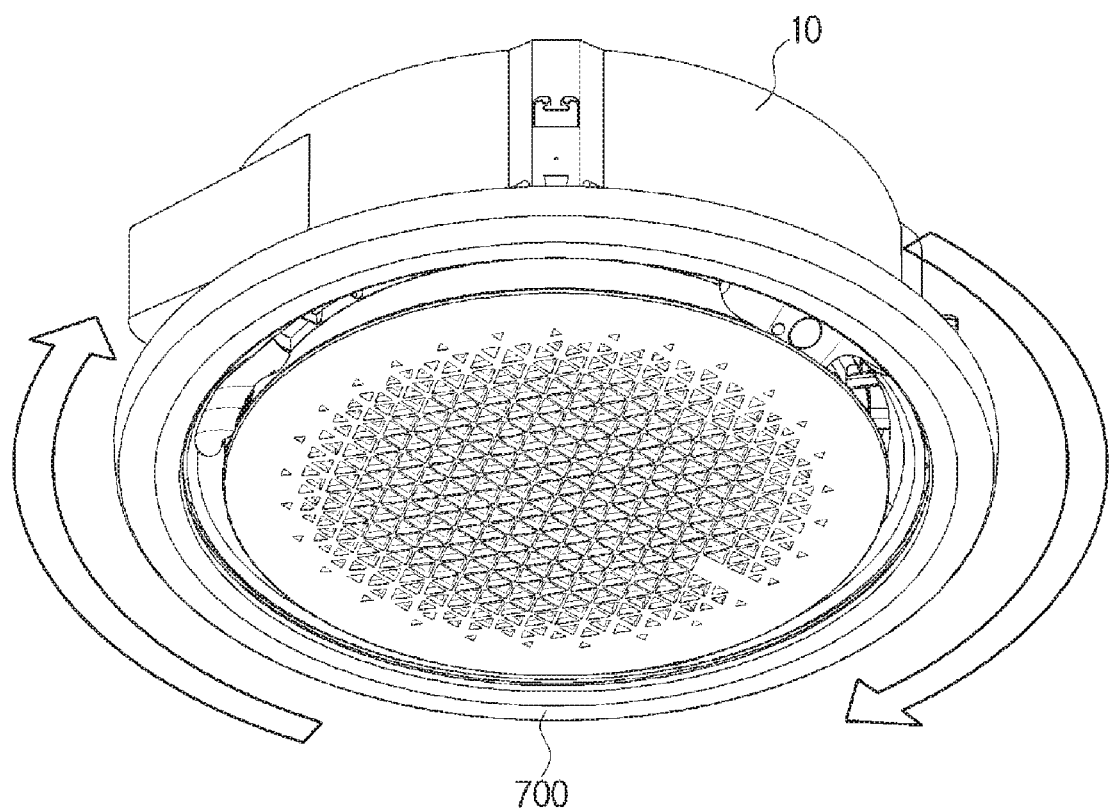
FIG. 30 is a view illustrating a state in which the cover member in accordance with another embodiment of the present disclosure is coupled.
Figure 31:
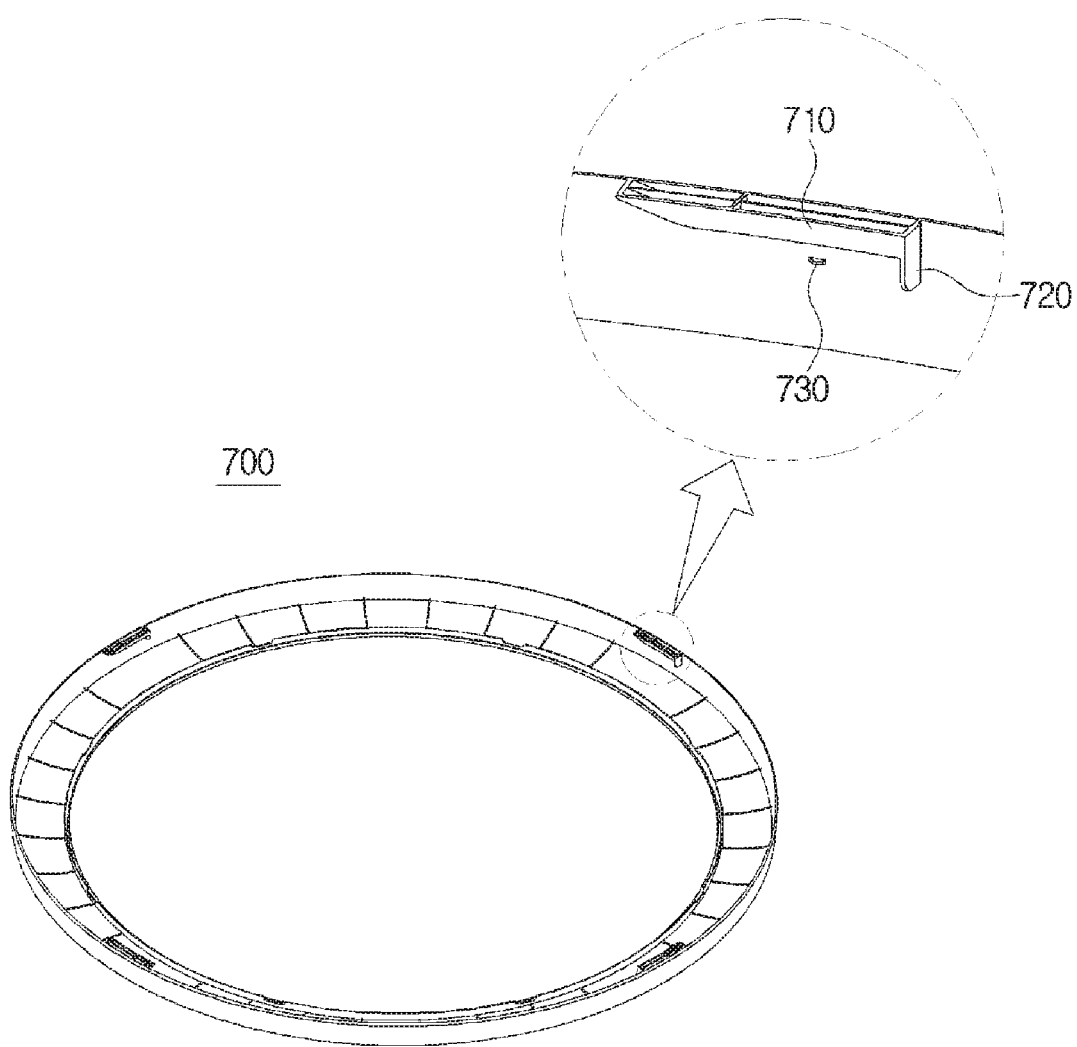
FIG. 31 is a perspective view of the cover member in accordance with another embodiment of the present disclosure.
Figure 32A:
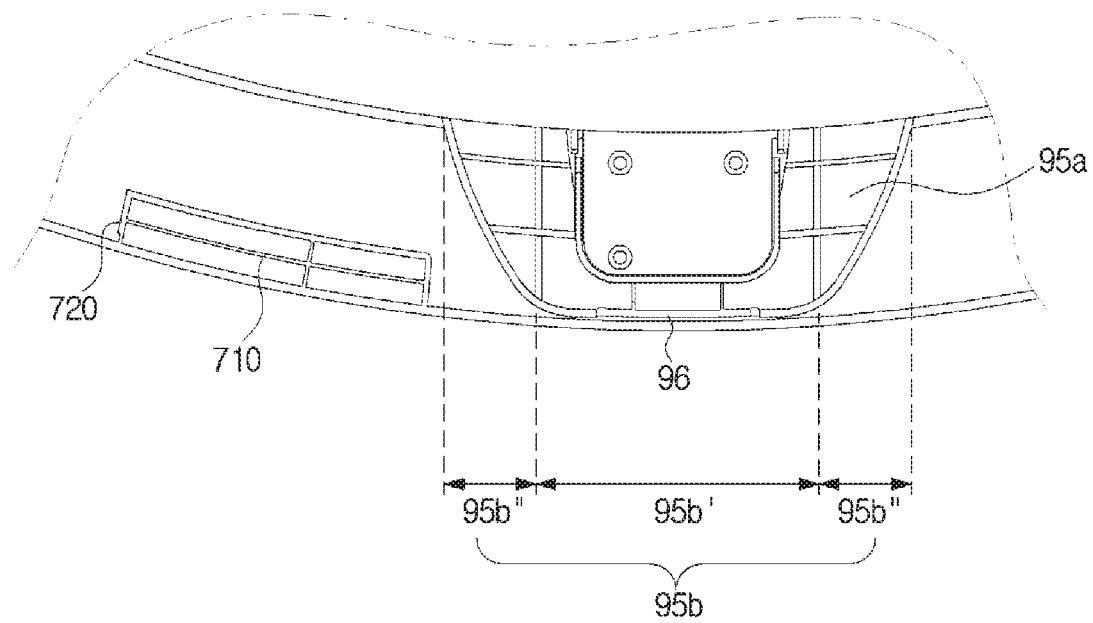
FIGS. 32A and 32B are top views illustrating a state in which the cover member in accordance with another embodiment of the present disclosure is coupled.
Figure 32B:
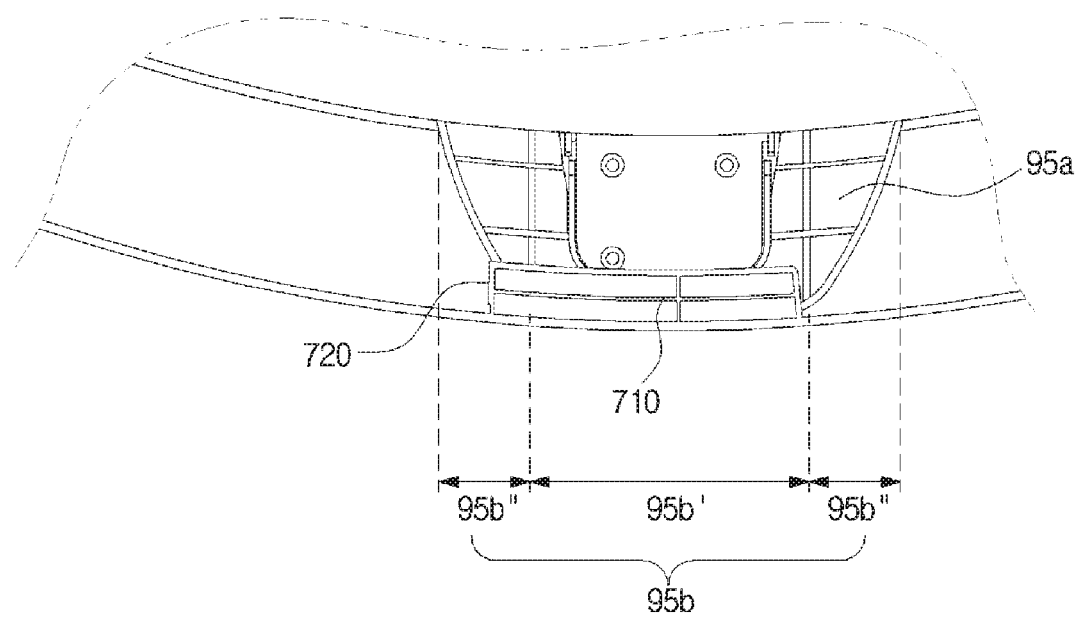

FIG. 29 is a view illustrating a state in which a cover member in accordance with another embodiment of the present disclosure is separated. FIG. 30 is a view illustrating a state in which the cover member in accordance with another embodiment of the present disclosure is coupled. FIG. 31 is a perspective view of the cover member in accordance with another embodiment of the present disclosure. FIGS. 32A and 32B are top views illustrating a state in which the cover member in accordance with another embodiment of the present disclosure is coupled.

The cover member 600 in accordance with one embodiment of the present disclosure shown in FIGS. 1, 3, and 23 to 28 may cover a separating space formed between an embedding hole and the housing 10 when the indoor unit 1 of the air conditioner is embedded in the ceiling so as not to expose the separating space.

In detail, when the housing 10 in accordance with one embodiment of the present disclosure is provided in a cylindrical shape and a conventional embedment hole is provided in a quadrangular shape, a separating space may occur between an outer circumferential surface of the housing 10 and corners of the quadrangular embedding hole. Accordingly, the cover member 600 may be provided in a shape with four rectangular corners, and may cover the separation space formed at the four rectangular corners.

However, recently, ceiling-installed air conditioners are not installed in embedding holes but a method of installing an air conditioner on a ceiling while an indoor unit thereof is entirely exposed is generally used.

When the indoor unit 1 of the air conditioner in accordance with one embodiment of the present disclosure is installed on the ceiling while being exposed as described above, since the housing 10 is formed in a cylindrical shape, it is unnecessary to form the cover member 600 in a quadrangular shape. In addition, as unity is lacking in a design of the indoor unit 1 of the air conditioner formed in a cylindrical shape, aesthetic properties may be deteriorated.

Accordingly, when the indoor unit 1 of the air conditioner is installed while being exposed, the cover member 700 in accordance with another embodiment of the present disclosure shown in FIGS. 28 to 32 may be provided in an annular shape including a radius corresponding to the outer circumferential surface of the housing 10 to improve the aesthetic properties of the indoor unit 1 of the air conditioner.

However, the annular cover member 700 may not only be applied to a case of being disposed on a ceiling while being exposed, but it may also be applied to a case of forming a circular embedding hole in the ceiling.

As shown in FIGS. 29 and 30, the cover member 700 may be pressurized by the user toward the indoor unit 1 of the air conditioner to be coupled with the indoor unit 1 of the air conditioner. When the cover member 700 is pressurized upward and in contact with one side of the lower housing 30 or the drain tray 90, the cover member 700 may be rotated to be fixed to the lower housing 30 or the drain tray 90.

In detail, as shown in FIG. 31, the cover member 700 has a circular opening and a coupling protrusion 710 which protrudes inward in a radial direction is provided on an inner circumferential surface of the cover member 700. When the coupling protrusion 710 is rotated by the user on the outer circumferential surface of the drain tray 90 and is then disposed at a position corresponding to the extension surface 95b at which the recessed portion 96 is disposed, that is, the extension surface 95b disposed on a side facing the outer circumferential surface of the drain tray 90 (hereinafter, the extension surface 95b will be defined as a first extension surface 95b' and the extension surface 95b extended outward from the drain tray 90 at both ends of the first extension surface 95b' will be defined as a second extension surface 95b"), the coupling protrusion 710 may be supported by an upper side of the first extension surface 95b' to be coupled with the cover member 700.

Referring to FIG. 32a, when the coupling protrusion 710 is not supported by the upper side of the first extension surface 95b', a coupling state of the drain tray 90 and the coupling protrusion 710 may not be maintained and fixed. However, as shown in FIG. 32b, when the coupling protrusion 710 is rotated along the outer circumferential surface of the drain tray 90 and is disposed on the first extension surface 95b', a lower side of the coupling protrusion 710 is supported by the first extension surface 95b', thereby allowing the cover member 700 to be supported by the drain tray 90.

As described above, the recessed portion 96 may be provided in another component such as the lower housing 30 including an assembled portion not in the drain tray 90.

As the cover member 700 is provided in an annular shape, the coupling protrusion 710 protrudes inward along an outer circumferential surface to allow the user to naturally rotate the cover member 700 and the coupling protrusion 710 to be disposed on the first extension surface 95b'. This is so the user may intuitively couple the cover member 700 for convenience and so that additional components are not required for coupling the cover member 700 with the indoor unit 1 of the air conditioner to reduce manufacturing costs and to simplify the process.

As shown in FIG. 31, a stopper 720 may be provided at one side of the coupling protrusion 710. As described above, the coupling protrusion 710 is disposed on the first extension surface 95b' due to a rotation in such a way that the cover member 700 is supported by the drain tray 90. Also, when the cover member 700 is separated, the user may separate the cover member 700 by causing the coupling protrusion 710 to depart from the first extension surface 95b' by rotating-pressurizing.

Here, even when a physical force such as an externally applied force is applied in a situation where the cover member 700 is not separated, the cover member 700 may be rotated. When the coupling protrusion 710 departs from the first extension surface 95b' due to the rotation, a coupling of the cover member 700 may be released without an intention to do so.

To prevent this, the stopper 720 may be provided at one side of the coupling protrusion 710 to prevent the cover member 700 from being arbitrarily rotated.

The stopper 720 may be extended upward from the one side of the coupling protrusion 710 and may protrude toward an inside of the cover member 700. When the coupling protrusion 710 is disposed on the first extension surface 95b', the stopper 720 may be disposed corresponding to one side of the second extension surface 95b". Accordingly, even when a rotating force is applied to the cover member 700, the stopper 720 is in contact with the second extension surface 95b", thereby limiting the rotation of the cover member 700.

An auxiliary coupling protrusion 730 to be in contact with one side of the recessed portion 96 when the coupling protrusion 710 is disposed above the first extension surface 95b' may be provided below the coupling protrusion 710.

The auxiliary coupling protrusion 730 may protrude toward the inside of the cover member 700 and may be extended as much as a length approximately corresponding to a thickness of the first extension surface 95b'. The auxiliary coupling protrusion 730 may be disposed to be in contact with a side of the recessed portion 96, at which the stopper 720 and the second extension surface 95b" are in contact with each other.

Rotation of the cover member 700 may be limited by the stopper 720 in one direction. However, when rotated in the opposite direction, the rotation may not be limited, thereby allowing the coupling protrusion to depart from the first extension surface 95b' as described above.

To prevent this, the auxiliary coupling protrusion 730 may be in contact with one side of the recessed portion 96 to limit the rotation of the cover member 700 in the direction opposite to the stopper 720.

Accordingly, the user may separate the cover member 700 by applying a force capable of causing the auxiliary coupling protrusion 730 to depart from the recessed portion 96 only when separating the cover member 700.

The auxiliary coupling protrusion 730 may protrude in a triangular shape in such a way that surfaces in diagonal directions may guide an insertion into or departure from the recessed portion 96.

Hereinafter, a configuration of the filter 120 will be described in detail.

Figure 33:
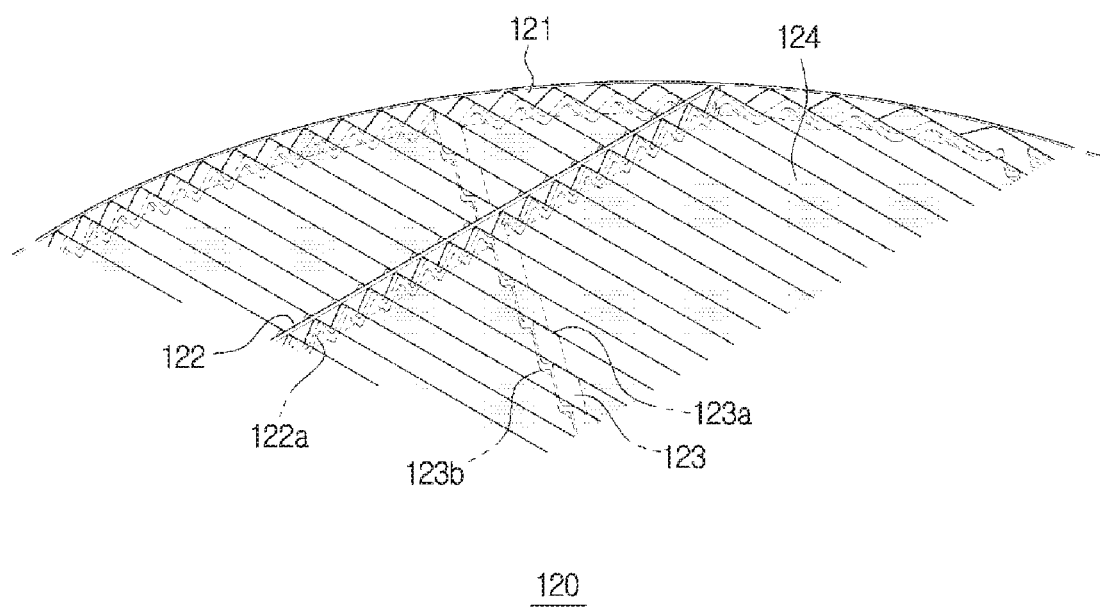
FIG. 33 is a partial perspective view of a filter in accordance with one embodiment of the present disclosure.
Figure 34:
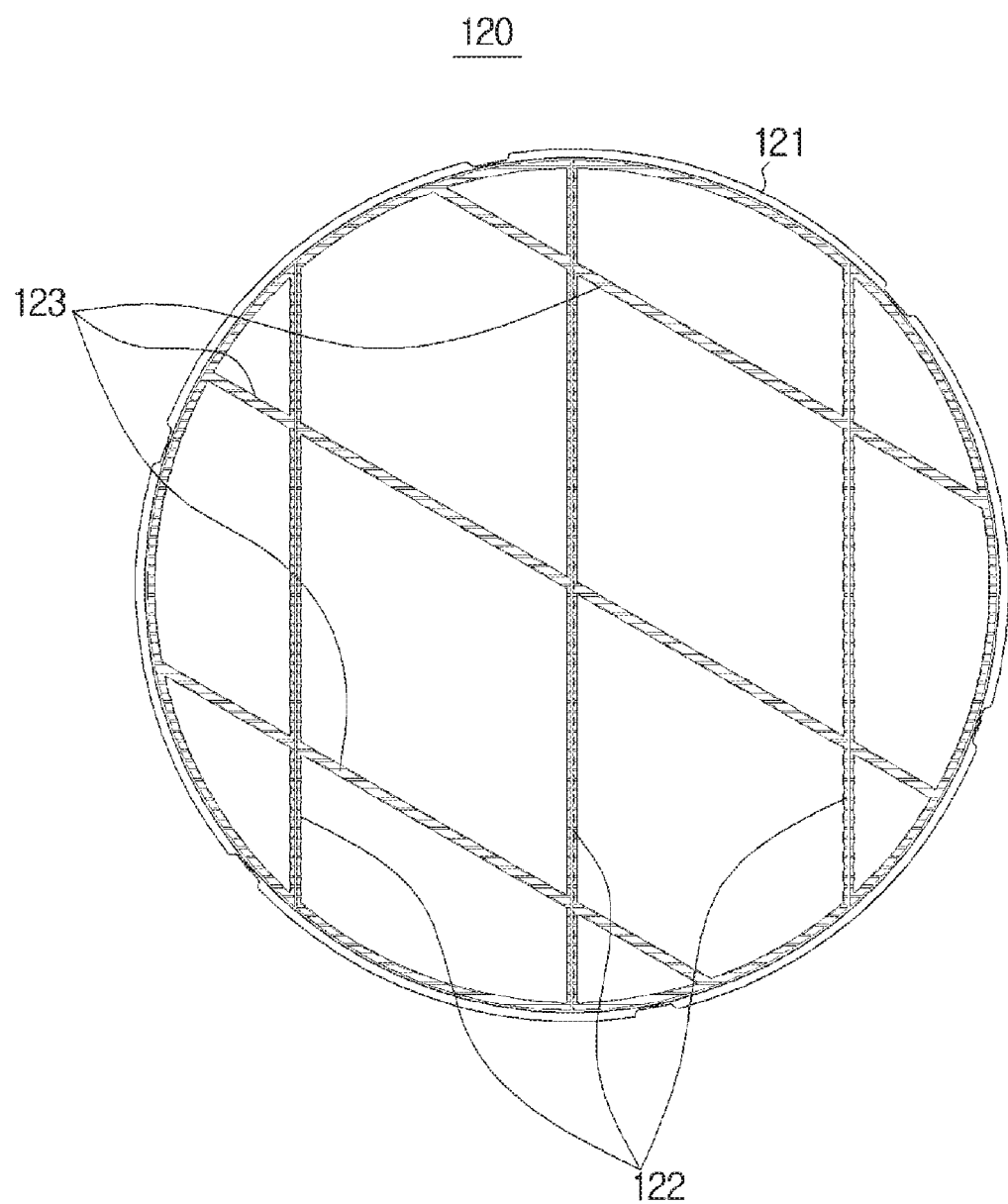
FIG. 34 is a top view of the filter in accordance with one embodiment of the present disclosure.
Figure 35:
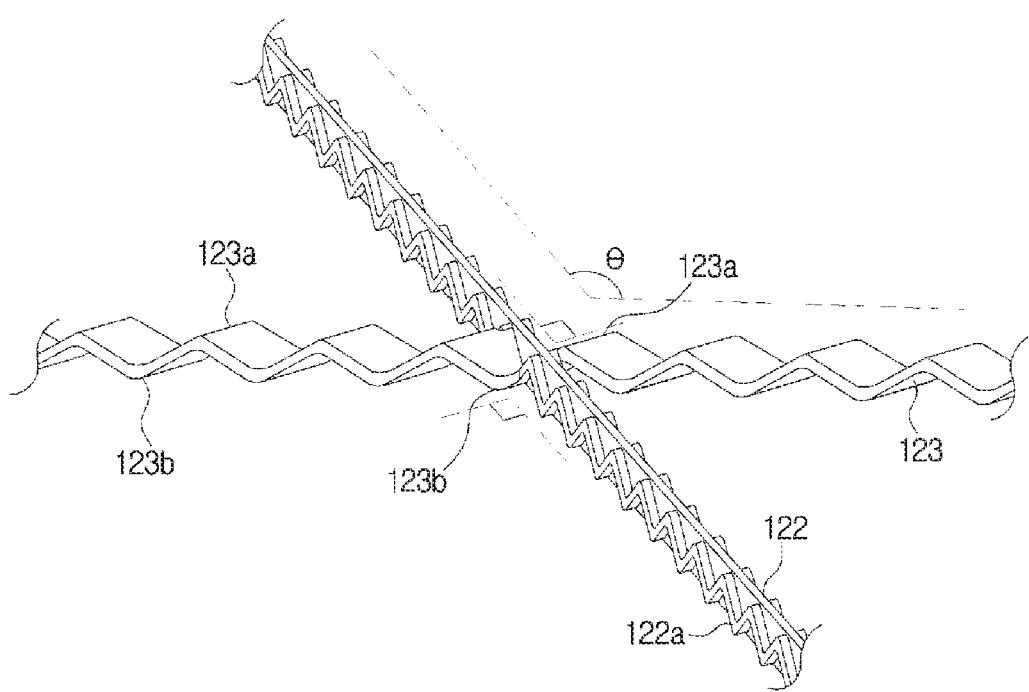
FIG. 35 is a partial enlarged view of the filter in accordance with one embodiment of the present disclosure.

FIG. 33 is a partial perspective view of a filter in accordance with one embodiment of the present disclosure. FIG. 34 is a top view of the filter in accordance with one embodiment of the present disclosure. FIG. 35 is a partial enlarged view of the filter in accordance with one embodiment of the present disclosure.

As described above, the filter 120 may be provided in a circular shape. Since the suction panel 100 is provided in an annular shape, and particularly since the indoor unit 1 of the air conditioner is formed in a cylindrical shape, the filter 120 may be formed in a shape corresponding thereto.

In a conventional air conditioner, an indoor unit is provided in a rectangular parallelepiped shape, and a panel provided with a suction port is provided in a quadrangular shape. A filter disposed in the quadrangular panel is generally provided in a quadrangular shape according to the shape of the panel. A suction flow path through which air flows into an air blowing fan through the suction port is generally provided in a circular shape in consideration of an air flow in such a way that the air is not suctioned in through four rectangular corners of the filter, which is an unnecessary space.

However, the filter 120 in accordance with one embodiment of the present disclosure may be formed in a circular shape, and a radius of the filter 120 is provided to correspond to a radius of a suction flow path of the indoor unit 1 of the air conditioner to fully utilize the filter 120 without unnecessary portions.

The filter 120 may include an outer circumferential frame 121 provided in a circular shape, a plurality of internal frames 122 extended in one direction toward an inside of the outer circumferential frame 121, and a plurality of reinforcing ribs 123 which intersect with the plurality of internal frames 122 and reinforce rigidity of the filter 120.

Also, as shown in FIG. 33, a mesh member 124 which collects dust in the air may be provided among the plurality of internal frames 122. The mesh member 124 may be provided in a corrugated shape including ridges 124a and furrows 124b.

The mesh member 124 may increase in cross section and may collect a large amount of dust when provided in the corrugated shape and forming a plurality of bent portions.

The mesh member 124 may be disposed among the plurality of internal frames 122 and may be coupled with both side of each of the plurality of internal frames 122.

Bent protrusions 122a including the same shapes as the ridges 124a and furrows 124b of the corrugated shape of the mesh member 124 are provided at both ends of the internal frame 122 to allow the mesh member 124 to easily get in contact with the both ends of the internal frame 122.

The plurality of reinforcing ribs 123, which intersect with the internal frames 122, may intersect on the mesh member 124. Here, the reinforcing ribs 123 may extend in a shape corresponding to the corrugated shape of the mesh member 124 to intersect with the internal frames 122 while supporting the mesh member 124.

That is, the reinforcing ribs 123 may intersect with the internal frames 122 while including bent portions 123c which include ridges 123a and furrows 123b corresponding to the corrugated shape of the mesh member 124 which includes the ridges 124a and furrows 124b.

The ridges 123a and the furrows 123b of the bent portions 123c may be formed corresponding to the ridges 124a and the furrows 124b of the mesh member 124 to allow the mesh member 124 to be supported by the reinforcing ribs 123 while maintaining the corrugated shape.

As shown in FIG. 34, an angle at which the internal frame 122 and the reinforcing rib 123 intersect one another may be within the range from 0 to 180 degrees.

In a conventional air conditioner, as a filter is provided in a quadrangular shape, internal frames and reinforcing ribs intersect at 90 degrees in consideration of an efficiency of suctioning air. However, in the filter 120 in accordance with one embodiment of the present disclosure, the internal frames 122 and the reinforcing ribs 123 may intersect one another at various angles without being limited in their intersecting angle The suction panel 100 includes a suction grill 101 (not shown) which forms the suction port 110. The intersecting angle of the internal frames 122 and the reinforcing ribs 123 may freely be set within the range from 0 to 180 degrees, thereby arranging the internal frames 122 and the reinforcing ribs 123 at a position of the suction grill 101.

Accordingly, since the internal frames 122 and the reinforcing ribs 123 are not exposed outward, aesthetic properties may increase.

As described above, the internal frames 122 and the reinforcing ribs 123 may intersect one another at various angles. However, as shown in FIG. 35, the ridges 123a or furrows 123b of the reinforcing ribs 123 in contact with the internal frames 122 may interest with the internal frames 122 at right angles.

That is, the entire arrangement of the internal frames 122 and the reinforcing ribs 123 may be within the range from 0 to 180 degrees, but angles between the internal frames 122 and the reinforcing ribs 123 at portions where the internal frames 122 and the reinforcing ribs 123 are in contact with one another may be provided as right angles.

Since the reinforcing ribs 123 includes the plurality of bent portions 123c, even when in contact with the internal frames 122 at right angles, the bent portions 123c are diagonally bent and then the reinforcing ribs 123 and the internal frames 122 may generally diagonally intersect.

The internal frames 122 and the reinforcing ribs 123 are in perpendicular contact with one another to allow the mesh member 124 to be supported by the internal frames 122 while maintaining the entire corrugated shape of the mesh member 124. When one side each of the internal frames 122 and the reinforcing ribs 123 get in contact with each other at angles other than right angles, creases occur in a section of the mesh member 124 corresponding thereto and it is then impossible to maintain the corrugated shape in some sections, thereby preventing an air flow and decreasing coupling forces between the internal frames 122 or the reinforcing ribs 123, which deteriorates durability.

However, in accordance with one embodiment of the present disclosure, the mesh member 124 may uniformly maintain the corrugated shape in the whole area in contact with the internal frames 122, thereby overcoming limitations described above.

As is apparent from the above description, a suction panel of an air conditioner in accordance with one embodiment of the present disclosure laterally rotates with respect to a housing and is separated to allow a user to easily separate the suction panel.

Also, a suction panel of an air conditioner in accordance with one embodiment of the present disclosure vertically rotates with respect to a housing and is separated to allow a user to easily separate the suction panel.

Also, a cover member of an air conditioner in accordance with one embodiment of the present disclosure is pressurized toward a housing and is coupled to allow a user to easily couple the cover member.

Also, a filter of an air conditioner in accordance with one embodiment of the present disclosure has a circular shape and includes filter frames in various shapes.

Although a few embodiments of the present disclosure have been shown and described, it should be appreciated by those skilled in the art that changes may be made to these embodiments without departing from the principles and spirit of the present disclosure, the scope of which is defined in the claims and their equivalents.

What is claimed is:

1. An air conditioner comprising:
    a housing including:
    a cylindrical portion, and
    a discharge port arranged at an inner side of an inner circumferential surface of the cylindrical portion and provided in an arc shape;
    a heat exchanger provided at an inner side of an inner circumferential surface of the discharge port and provided in an arc shape;
    a suction panel separably coupled to the side of the inner circumferential surface of the discharge port, including a suction port through which air is drawn, and provided in a circular shape; and
    a cover separably coupled to an outer side of an outer circumferential surface of the discharge port, configured to cover an end of the cylindrical portion, and having an inner circumferential surface provided in a shape corresponding to the outer circumferential surface of the discharge port,
    wherein the suction panel and the cover are separably coupled to the housing by respectively being rotated in a circumferential direction of the cylindrical portion.

2. The air conditioner of claim 1, wherein the suction panel and the cover are coupled to the housing by respectively being rotated in a first circumferential direction of the cylindrical portion, and are separated from the housing by respectively being rotated in a second circumferential direction of the cylindrical portion opposite to the first circumferential direction.

3. The air conditioner of claim 1, wherein the suction panel is coupled to and separated from the housing in a circumferential direction of the suction panel concentric to the circumferential direction of the cylindrical portion, and the cover is coupled to and separated from the housing in a circumferential direction of the cover concentric to the circumferential direction of the cylindrical portion.

4. The air conditioner of claim 1, wherein
    the suction panel further comprises a first coupling portion configured to be coupled to the housing in a direction the suction panel rotates; and
    the housing further comprises a second coupling portion configured to be coupled to the first coupling portion in the direction the suction panel rotates.

5. The air conditioner of claim 4, wherein
    the cover further comprises a third coupling portion configured to be coupled to the housing in the direction the suction panel rotates and
    the housing further comprises a fourth coupling portion configured to be coupled to the third coupling portion in the direction the suction panel rotates.

6. The air conditioner of claim 4, wherein the first coupling portion protrudes in an axial direction of the cylindrical portion and is configured to be inserted into the second coupling portion in the circumferential direction of the cylindrical portion.

7. The air conditioner of claim 6, wherein the second coupling portion is provided to be concave in the housing relative to the cylindrical portion in the axial direction of the cylindrical portion, and is configured to be receive the first coupling portion in the axial direction of the cylindrical portion and allow the first coupling portion to rotate in the circumferential direction of the cylindrical portion.

8. The air condition of claim 7, wherein the second coupling portion includes a guide groove for guiding the first coupling portion in the axial direction of the cylindrical portion when the first coupling portion is rotated in a circumferential direction of the cylindrical portion.

9. The air conditioner of claim 8, wherein the first coupling portion further comprises a supporting step configured to support the first coupling portion inserted into the second coupling portion,
    wherein the supporting step protrudes from the first coupling portion in the circumferential direction of the cylindrical portion.

10. The air conditioner of claim 4, wherein one of the first coupling portion and the second coupling portion includes a coupling hook having a hook shape, and a remaining one of the first coupling portion and the second coupling portion includes an insertion hole configured to receive the coupling hook.

11. The air conditioner of claim 5, wherein the third coupling portion protrudes toward a center of the cover from an inner circumferential surface of the cover,
    wherein the fourth coupling portion protrudes in a radial direction of the cylindrical portion from an outer circumferential surface of the housing.

12. The air conditioner of claim 11, wherein the third coupling portion is provided to be coupled to the fourth coupling portion by aligning the third coupling portion with the fourth coupling portion in an axial direction of the cylindrical portion by rotating the cover relative to the cylindrical portion in the circumferential direction of the cylindrical portion.

13. The air conditioner of claim 1, wherein the suction panel further comprises a filter provided to remove a foreign substance in air introduced through the suction port,
    wherein the filter is provided in a circular shape and is separably coupled to the suction panel.

14. The air conditioner of claim 13,
wherein the suction panel further comprises a filter support configured to support the filter, and
wherein the filter is provided to be coupled to the filter support in a radial direction of the filter.

15. The air conditioner of claim 14, wherein the filter is provided to be inserted into the filter support in the radial direction of the filter.

16. An air conditioner comprising:
a housing including a cylindrical portion and a discharge port;
a heat exchanger arranged at an inner side of an inner circumferential surface of the discharge port and provided in an arc shape;
a suction panel separably coupled to the side of the inner circumferential surface of the discharge port, including a suction port through which air is drawn, and provided in a circular shape;
a cover separably coupled to an outer side of an outer circumferential surface of the discharge port, configured to cover an end of the cylindrical portion, and having an inner circumferential surface provided in a shape corresponding to the outer circumferential surface of the discharge port,
wherein the suction panel and the cover are coupled to the housing by respectively being rotated in a first circumferential direction of the cylindrical portion, and are separated from the housing by respectively being rotated in a second circumferential direction of the cylindrical portion opposite to the first circumferential direction.

17. The air condition of claim 16, wherein the suction panel and the cover are separably coupled to the housing by respectively being rotated in a circumferential direction of the cylindrical portion.

18. The air condition of claim 17, wherein the suction panel is coupled to and separated from the housing in a circumferential direction of the suction panel concentric to the circumferential direction of the cylindrical portion, and
the cover is coupled to and separated from the housing in a circumferential direction of the cover concentric to the circumferential direction of the cylindrical portion.

19. The air conditioner of claim 17, wherein:
the suction panel further comprises a first coupling portion configured to be coupled to the housing a direction the suction panel rotates and
the housing further comprises a second coupling portion configured to be coupled to the first coupling portion in the direction the suction panel rotates;
the cover further comprises a third coupling portion configured to be coupled to the housing in the direction the suction panel rotates, and
the housing further comprises a fourth coupling portion configured to be coupled to the third coupling portion in the direction the suction panel rotates.

20. The air conditioner of claim 19, wherein the first coupling portion and the third coupling portion are separated from or coupled to the second coupling portion and the fourth coupling portion, respectively, by respective rotation of the suction panel and the cover member in the circumferential direction of the cylindrical portion.

* * * * *

UNITED STATES PATENT AND TRADEMARK OFFICE
CERTIFICATE OF CORRECTION

PATENT NO. : 10,760,818 B2
APPLICATION NO. : 16/820927
DATED : September 1, 2020
INVENTOR(S) : Dong Yoon Lee et al.

Page 1 of 1

It is certified that error appears in the above-identified patent and that said Letters Patent is hereby corrected as shown below:

In the Claims

Column 26, Line 30:
Claim 8, delete "air condition" and insert -- air conditioner --, therefor.

Column 28, Line 1:
Claim 17, delete "air condition" and insert -- air conditioner --, therefor.

Column 28, Line 5:
Claim 18, delete "air condition" and insert -- air conditioner --, therefor.

Signed and Sealed this
Twenty-second Day of December, 2020

Andrei Iancu
*Director of the United States Patent and Trademark Office*